US010133271B2

(12) United States Patent
Hutson

(10) Patent No.: US 10,133,271 B2
(45) Date of Patent: Nov. 20, 2018

(54) MULTI-AXIS CONTROLLLER

(71) Applicant: QUALCOMM Incorporated, San Diego, CA (US)

(72) Inventor: Donald Bolden Hutson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 15/081,211

(22) Filed: Mar. 25, 2016

(65) Prior Publication Data

US 2017/0277176 A1    Sep. 28, 2017

(51) Int. Cl.
| | |
|---|---|
| *G05D 1/00* | (2006.01) |
| *B64C 39/02* | (2006.01) |
| *B64D 47/08* | (2006.01) |
| *G06F 3/01* | (2006.01) |
| *G06F 3/0338* | (2013.01) |
| *G06F 3/0346* | (2013.01) |

(Continued)

(52) U.S. Cl.
CPC ......... *G05D 1/0016* (2013.01); *B64C 39/024* (2013.01); *B64D 47/08* (2013.01); *G05D 1/005* (2013.01); *G05D 1/0094* (2013.01); *G06F 3/011* (2013.01); *G06F 3/0338* (2013.01); *G06F 3/0346* (2013.01); *B64C 2201/146* (2013.01); *G06F 3/016* (2013.01); *G06F 3/02* (2013.01); *G06F 3/0362* (2013.01); *G06F 3/03543* (2013.01); *G06F 3/03549* (2013.01); *G06F 3/16* (2013.01)

(58) Field of Classification Search
CPC ... B62D 1/00; B64C 39/024; B64C 2201/146; B64D 47/08; G05D 1/0016; G05D 1/005; G05D 1/0094; G06F 3/011; G06F 3/016; G06F 3/02; G06F 3/0338; G06F 3/0346; G06F 3/03543; G06F 3/03549; G06F 3/0362; G06F 3/16
See application file for complete search history.

(56) References Cited

U.S. PATENT DOCUMENTS

| | | | |
|---|---|---|---|
| 2013/0293362 A1 | 11/2013 | Parazynski | |
| 2015/0289615 A1* | 10/2015 | Welsch | G06F 1/163 224/219 |

(Continued)

FOREIGN PATENT DOCUMENTS

| | | | | |
|---|---|---|---|---|
| EP | 2364757 A1 | 9/2011 | | |
| FR | 2764091 A1 * | 12/1998 | | B60L 11/18 |

(Continued)

OTHER PUBLICATIONS

International Search Report and Written Opinion—PCT/US2017/014716—ISA/EPO—Apr. 12, 2017.
Drone Warz: "Dog Fighting Quad Copters Controlled by Leap Motion Technology," Mission Statement, Retrieved dated on Nov. 1, 2016, and Retrieved from the Internet URL: http://dronewarz.co.uk/home/mission.html, 5 pages.
Goodner S., "VR or Mobile Gaming? Take Nod Lab's Wireless Ring Controller with You," Jun. 17, 2015, Technology Tell, Retrieved dated on Nov. 1, 2016, and Retrieved from the Internet URL: http://www.technologytell.com/gadgets/160490/vr-mobile-gamming-take-nod-labs-wireless-ring-controller/, 7 pages.

(Continued)

*Primary Examiner* — Jerrah Edwards
(74) *Attorney, Agent, or Firm* — Paradice and Li LLP

(57) ABSTRACT

Embodiments described herein relate to a controller for controlling various aspects of a Unmanned Aerial Vehicle (UAV), the controller including, but not limited to, a controller body having a first portion configured to secure to a user of the controller and a first controller configured for controlling at least flight of the UAV. The controller is portable via the first portion. The first controller is operable with a single hand of the user.

31 Claims, 10 Drawing Sheets

(51) Int. Cl.
   *G06F 3/02*     (2006.01)
   *G06F 3/0354*   (2013.01)
   *G06F 3/0362*   (2013.01)
   *G06F 3/16*     (2006.01)

(56) References Cited

U.S. PATENT DOCUMENTS

2015/0290494 A1    10/2015  King
2016/0198088 A1*    7/2016  Wang ................. H04N 5/23238
                                                         348/36
2016/0340035 A1*   11/2016  Duru ....................... B64C 27/20

FOREIGN PATENT DOCUMENTS

FR       2764091 A1    12/1998
WO    2016029169 A1     2/2016

OTHER PUBLICATIONS

Trew J., Engadget: "DJI's Inspire 1 Hand-Held Gimbal brings its Flying Camera Down to Earth," Jan. 10, 2015, Retrieved dated on Nov. 1, 2016, Retrieved from the Internet URL: http://www.engadget.com/2015/01/10/djis-inspire-1-hand-held-gimbal/, 10 pages.

UAO Staff, "Yuneec Launches Typhoon Wizard for One-Handed UAV Flight Control," Oct. 13, 2015, Retrieved dated on Nov. 1, 2016, Retrieved from the Internet URL: http://unmanned-aerial.com/yuneec-launches-typhoon-wizard-for-one-handed-uav-flight-control/, 5 pages.

\* cited by examiner

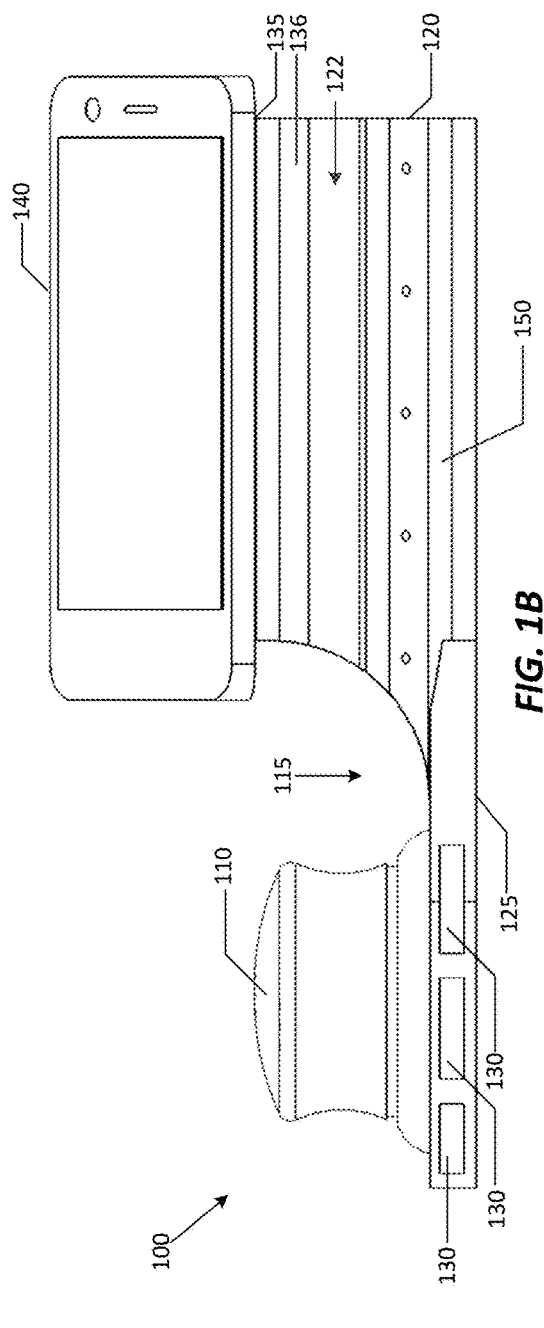
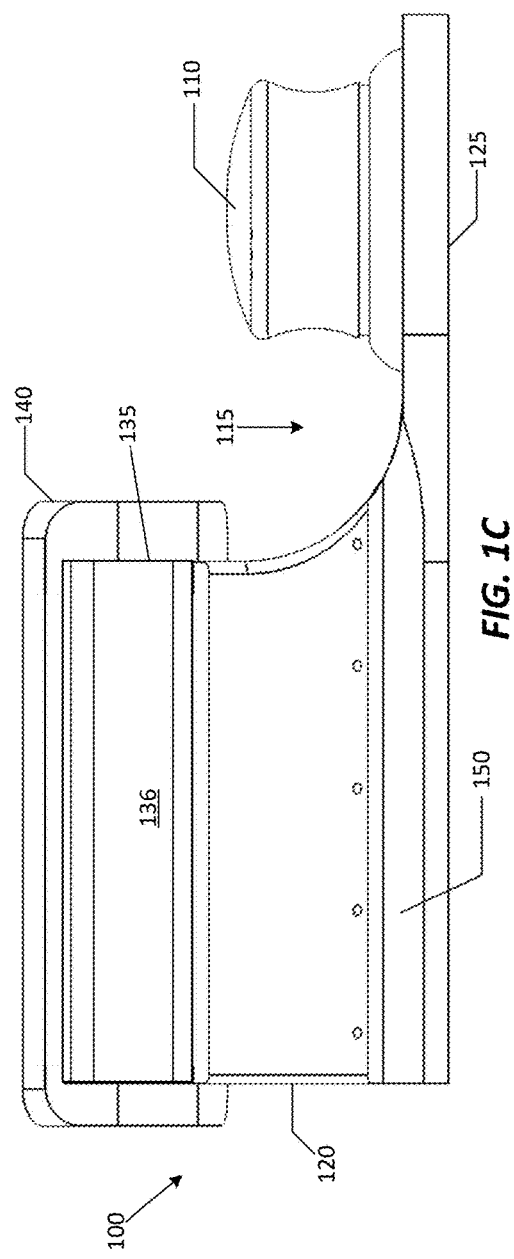

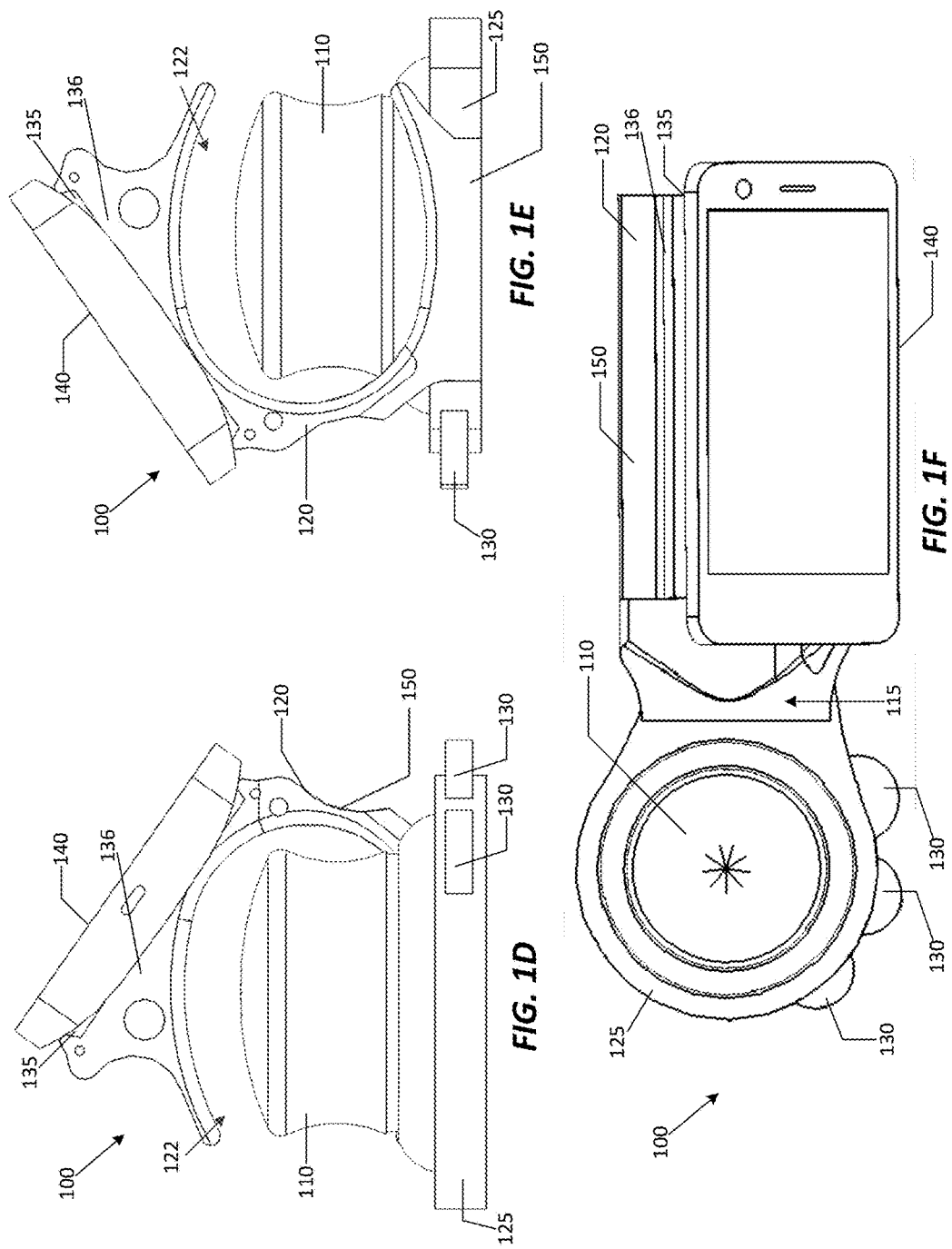

MULTI-AXIS CONTROLLLER

BACKGROUND

A variety of Unmanned Aerial Vehicles (UAVs) have been developed, including Remote Control (RC) planes for the hobbyists, and more advanced "drones" or UAVs for other applications including commercial and military. UAV configurations, such as "quadcopter" or four-rotor configurations have been developed for specific or general hobby, commercial, or military applications.

Conventional UAV controllers, including joysticks and tablets, typically require both hands to operate. For example, a first hand of the user may control yawing and throttling while a second hand of the user may control rolling and pitching. When both hands are occupied to control flight of the UAV, the user would have no free hand to control other aspects of the UAV, such as cameras, sensors, flight modes, and/or the like. Typically, the user must release one flight control interactive element (governing half of the flight controls) in order to operate the camera or other sensors on the UAV, resulting in inconvenience and flight risks.

SUMMARY

Embodiments described herein are concerned with a UAV controller (e.g. a remote control) for controlling various aspects of a UAV. The controller may include a controller body forming a support structure. The controller body may have a first portion for securing to a user of the controller to allow the controller to be portable to the user via the first portion. When the first portion is secured to the user, the user may still have both hands free to control the various aspects of the UAV by interacting with one or more of a first controller, second controller, third controller, or fourth controller. In some embodiments, the first portion may form a sleeve or brace for securing to an arm (e.g., a forearm) of the user while leaving the hand and fingers of the arm (to which the first portion is second to) free to operate the first controller.

The first controller may be a joystick or another suitable interactive element configured to control at least the flight (e.g., throttling, yawing, pitching, and rolling) of the UAV. The first controller may be a 6-axis controller that enables controls up to 6 Degrees-of-Freedom (DOF). Thus, the controller according to the embodiments may enable the user to control the flight of the UAV with one hand/arm.

The controller may include the second controller enabling additional controls of the UAV. The second controller may include an Inertial Measurement Unit (IMU) or other accelerometer and gyroscope combinations for sensing movement of the arm when the first portion is secured to the arm. The second controller may enable controls up to 6-DOF for one or more of the flight of the UAV, flight mode of the UAV, at least one sensor of the UAV, at least one camera of the UAV, orientation of the UAV, software settings on the UAV, landing mode of the UAV, take-off configurations of the UAV, or payload settings of the UAV. Thus, the combination of the first controller and the second controller may enable up to 12-DOF controls of the various aspects of the UAV.

The controller may include the third controller for controlling additional aspects of the UAV. In some embodiments, the controller may be configured to be coupled to a wireless communication device. The wireless communication device may include an output device (e.g., a screen display, a speaker, and/or the like) for outputting audio data, visual data, and/or other sensor outputs to the user when the first portion is secured to the user. The wireless communication device may also include an input device (e.g., the fourth controller) for controlling additional aspects of the UAV.

In some embodiments, a controller for a UAV includes a controller body, the controller body having a first portion configured to secure to a user of the controller, the controller body configured to be portable via the first portion and a second portion, the second portion includes a first controller configured for controlling at least flight of the UAV. The first controller is configured to be operable with a single hand of the user.

In some embodiments, the first controller is configured to control throttling, yawing, pitching, and rolling the UAV.

In some embodiments, the first controller is a 6-axis joystick.

In some embodiments, the first controller is configured for the user to control the flight of the UAV with the single hand without using another hand while the first portion is secured to the user.

In some embodiments, the first portion is configured to be secured onto an arm of the user. The first portion is configured to allow the single hand associated with the arm to interact with the first controller while the first portion is secured to the arm of the user.

In some embodiments, the first portion is configured to allow fingers and wrist of the single hand to move for operating the first controller.

In some embodiments, the first portion is configured to be secured to an arm associated with the single hand of the user. The controller is supported by only the arm associated with the single hand of the user for portability.

In some embodiments, the first portion forms a sleeve configured to couple to at least a portion of the arm of the user.

In some embodiments, the sleeve has a C-shaped cross section defining an interior volume for receiving the arm of the user. The controller is supported by the arm while the arm is received in the interior volume.

In some embodiments, the controller further includes a second controller configured to control one or more of the flight of the UAV, flight mode of the UAV, at least one sensor of the UAV, at least one camera of the UAV, orientation of the UAV, software settings on the UAV, landing mode of the UAV, take-off configurations of the UAV, or payload settings of the UAV.

In some embodiments, the second controller includes an Inertial Measurement Unit (IMU) including at least three accelerometers and three gyroscopes.

In some embodiments, one of the first controller and second controller is configured to control the flight of the UAV. Another one of the first controller and second controller is configured to control one or more of a flight mode of the UAV, at least one sensor of the UAV, at least one camera of the UAV, orientation of the UAV, software settings on the UAV, landing mode of the UAV, take-off configurations of the UAV, or payload settings of the UAV.

In some embodiments, the second controller is configured to sense an orientation of the controller. One or more of the first controller or the second controller is configured to control one or more of the flight of the UAV, flight mode of the UAV, at least one sensor of the UAV, at least one camera of the UAV, orientation of the UAV, software settings on the UAV, landing mode of the UAV, take-off configurations of the UAV, or payload settings of the UAV based on the orientation of the controller.

In some embodiments, the controller further includes a third controller configured to control one or more of the flight of the UAV, flight mode of the UAV, at least one sensor of the UAV, at least one camera of the UAV, orientation of the UAV, software settings on the UAV, landing mode of the UAV, take-off configurations of the UAV, or payload settings of the UAV.

In some embodiments, the third controller is one or more of a button, wheel, mouse, level, slider, touch screen, knob, joystick, switch, or trackball.

In some embodiments, a first one of the first controller, second controller, and third controller is configured to control the flight of the UAV. A second one of the first controller, second controller, and third controller is configured to control one or more of a flight mode of the UAV, at least one sensor of the UAV, at least one camera of the UAV, orientation of the UAV, software settings on the UAV, landing mode of the UAV, take-off configurations of the UAV, or payload settings of the UAV. A third one of the first controller, second controller, and third controller is configured to control one or more of the flight mode of the UAV, at least one sensor of the UAV, at least one camera of the UAV, orientation of the UAV, software settings on the UAV, landing mode of the UAV, take-off configurations of the UAV, or payload settings of the UAV.

In some embodiments, the controller further includes a feedback device configured to provide one or more of audio feedback, visual feedback, or tactile feedback.

In some embodiments, the feedback device is configured to provide one or more of the audio feedback, visual feedback, or tactile feedback in response to receiving a feedback signal from the UAV.

In some embodiments, the first portion and the second portion are different portions of the controller.

In various embodiments, a method for providing a controller for a UAV includes providing a controller body having a first portion and a second portion. The first portion is configured to secure to a user of the controller. The controller body is configured to be portable via the first portion. The second portion includes a first controller configured for controlling at least flight of the UAV. The first controller is configured to be operable with a single hand of the user.

In some embodiments, an apparatus for controlling a UAV includes means securing the apparatus to a user, wherein the apparatus is portable via the means for securing the apparatus to the user, and means for controlling at least flight of the UAV, wherein the means for controlling at least the flight of the UAV is operable with a single hand of the user.

According to some embodiments, a controller for a UAV includes a first portion configured to secure to a first arm of a user such that the controller moves with the first arm of the user when the first portion is secured to the first arm and a first controller for accepting user input for controlling the UAV, wherein the controller is configured to be operable by a hand of the first arm while the first portion is secured to the first arm.

In some embodiments, the controller further includes a second portion on which the first controller is arranged, wherein the second portion extends from the first portion.

In some embodiments, the second portion forms a space between the first portion and the first controller for receiving a wrist of the arm when the first portion is secured to the first arm.

In some embodiments, the controller further includes a second controller configured to sense motion of the controller.

In some embodiments, the first controller is a joystick configured to receive user input in up to 6 Degree-of-Freedom (DOF). The second controller includes one or more of at least one accelerometer and at least one gyroscope configured to receive user input in up to 6 DOF.

In some embodiments, one of the first controller or the second controller is configured to control flight of the UAV. Another one of the first controller or the second controller is configured to control one or more of a position or orientation of a camera of the UAV.

In some embodiments, the controller further includes a third controller arranged on a second portion. The third controller is one or more of a button, wheel, mouse, level, slider, touch screen, knob, joystick, switch, or trackball. The third controller is configured to control one or more of a flight mode of the UAV, at least one sensor of the UAV, at least one camera of the UAV, orientation of the UAV, software settings on the UAV, landing mode of the UAV, take-off configurations of the UAV, or payload settings of the UAV.

In some embodiments, the controller further includes a third portion for receiving a wireless communication device, wherein the third portion includes an electrical connection that connects to the wireless communication device for transfer of data or power between the controller and the wireless communication device.

In some embodiments, the controller further includes a landing platform configured to allow the UAV to land on the controller.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

FIG. 1B is a front view of the controller according to various embodiments.

FIG. 1C is a back view of the controller according to various embodiments.

FIG. 1D is a first side view of the controller according to various embodiments.

FIG. 1E is a second side view of the controller according to various embodiments.

FIG. 1F is a top view of the controller according to various embodiments.

DETAILED DESCRIPTION

Figure 1A:
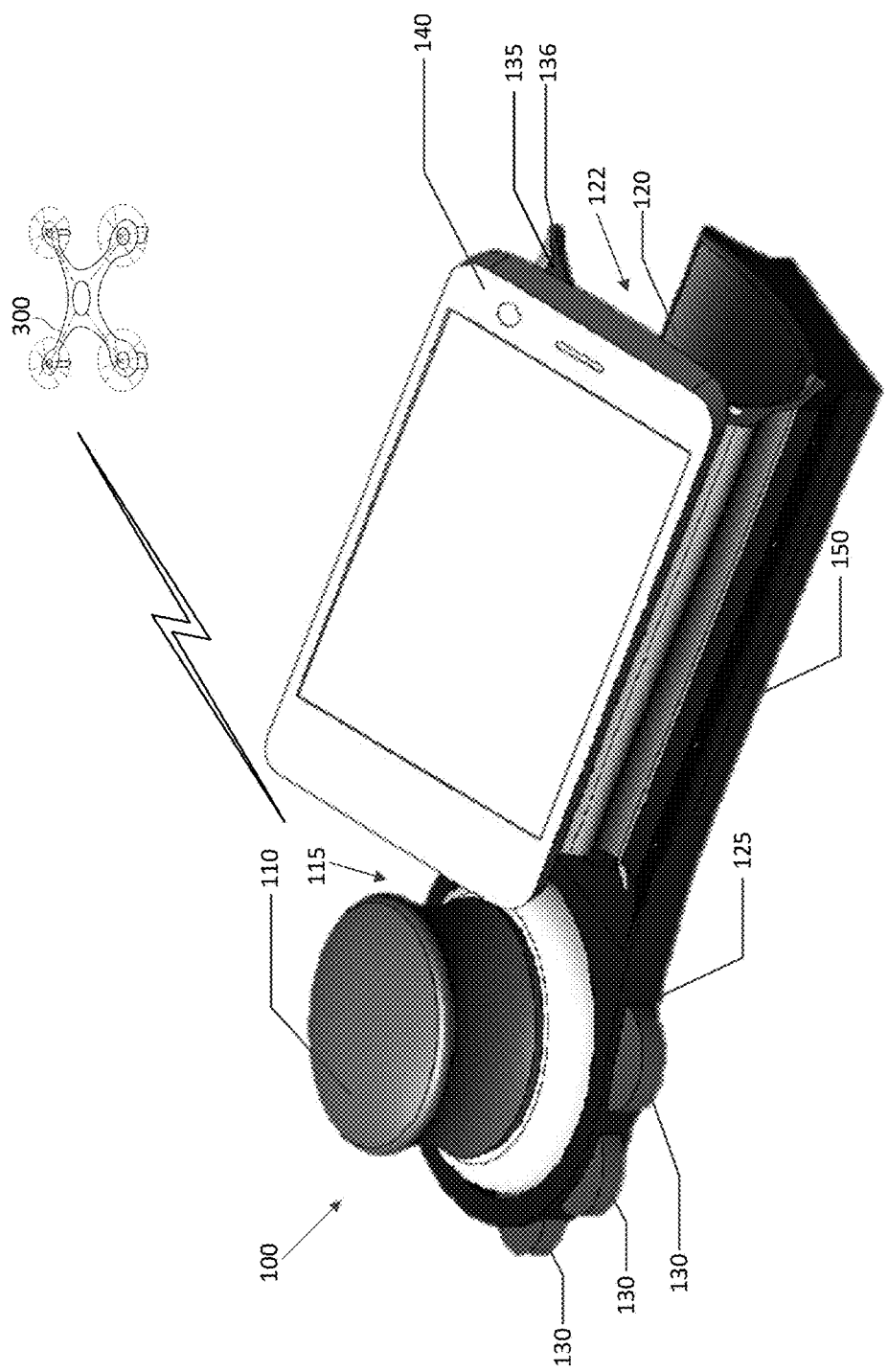
FIG. 1A is a diagram illustrating an example of an interaction between a Unmanned Aerial Vehicle (UAV) and a controller (in perspective view) according to various embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Embodiments described herein relate to a Unmanned Aerial Vehicle (UAV) controller (e.g., a remote control) that enables the user to control flight of the UAV with one hand, leaving the other hand free for other tasks, such as controlling a camera or other sensors on the UAV. In some embodiments, the user may control the flight of the UAV, the camera and/or other sensors of the UAV with one hand. The controller may include one or more of a first controller, second controller, third controller, or fourth controller.

The controller may include a securing member (e.g., a first portion) for securing the controller to the user. The first portion may include a sleeve or arm brace for securing to a forearm or another body part of the user. For example, the first portion may include a tubular sleeve having a channel or interior space to receive the user's forearm. In alternative or additional embodiments, the first portion may include one or more of a strap, string, Velcro, clamp, elastic fastener, and the like to secure the controller to the user. The first portion may fit over a portion of the user's forearm, but may leave a wrist and hand associated with that forearm free to operate the first controller. The first controller may enable the user to control typical flight actions (including throttling, yawing, pitching, and rolling) with one hand. That is, the first portion may be coupled or otherwise attached to the forearm associated with a first hand of the user such that the first hand can operate the first controller without requiring additional support or operation by the second hand. That is, the controller may be supported or held by the arm (associated with the first hand) alone. For example, the controller may be held by the user with the arm (associated with the first hand) above ground without any additional support (such as another hand/arm, another body part, article of clothing, surface (e.g., desktop, wall, tree, and the like) to maintain a position/orientation of the controller.

The first controller may include a joystick or movable knob for controlling the flight of the UAV in multiple (e.g. six) axes (including three axes of rotation and three axes of translation). In response to the first controller being moved in, the UAV may be configured to move accordingly based on correspondence or mapping.

In some embodiments, the controller may include one or more feedback devices such as vibration motors, servos, speakers, and the like to warn the user of an incoming collision, navigation indication, danger, or otherwise provide notification(s) to the user. Particularly, in response to the UAV detecting an object that would cause an imminent collision in a certain direction, the feedback devices may provide feedback (e.g., audio signals or vibration/opposing force against operating the first controller to move the UAV in that direction) for warning the user.

In some embodiments, the controller may include additional controllers (e.g., a second controller, a third controller, and/or the like) arranged to be operated by the user to control aspects of the UAV, including, but not limited to, flight of the UAV, flight mode of the UAV, at least one sensor of the UAV, at least one camera of the UAV, orientation of the UAV, software settings on the UAV, landing mode of the UAV, take-off configurations of the UAV, or payload settings of the UAV. For example, the second controller may accept user input based on motions of the arm to which the first portion is secured. Illustrating with a non-limiting example, the second controller may be include one or more accelerometers, gyroscopes, and/or the like for detecting the motion of the arm of the user. The third controller may include additional interactive elements such as, but not limited to, at least one of a button, wheel, mouse, level, slider, touch screen, knob, joystick, switch, or trackball for accepting user input.

The combination of the first controller and the second controller may enable the user to control two or more aspects of the UAV in flight with one hand. Illustrating with a non-limiting example, the first controller may be configured to control the flight of the UAV, and the second controller may be configured to control the camera (e.g., a camera gimbal) or other sensors of the UAV, vice versa. With the additional third controller, additional aspects of the UAV may be controlled. The user may interact with the first, second, and third controller with one hand.

In some embodiments, the controller may be coupled to a wireless communication device via a third portion (e.g., a magnet, Velcro, clip, clamp, and/or the like). The wireless communication device may display flight control info, visual data from the UAV camera, flight maps, and/or the like. The user may use a second hand of a second arm (the arm that is not secured to the controller via the first portion) to interact with the wireless communication device. The wireless communication device may include an input device for accepting user input, as the fourth controller.

Figure 1G:
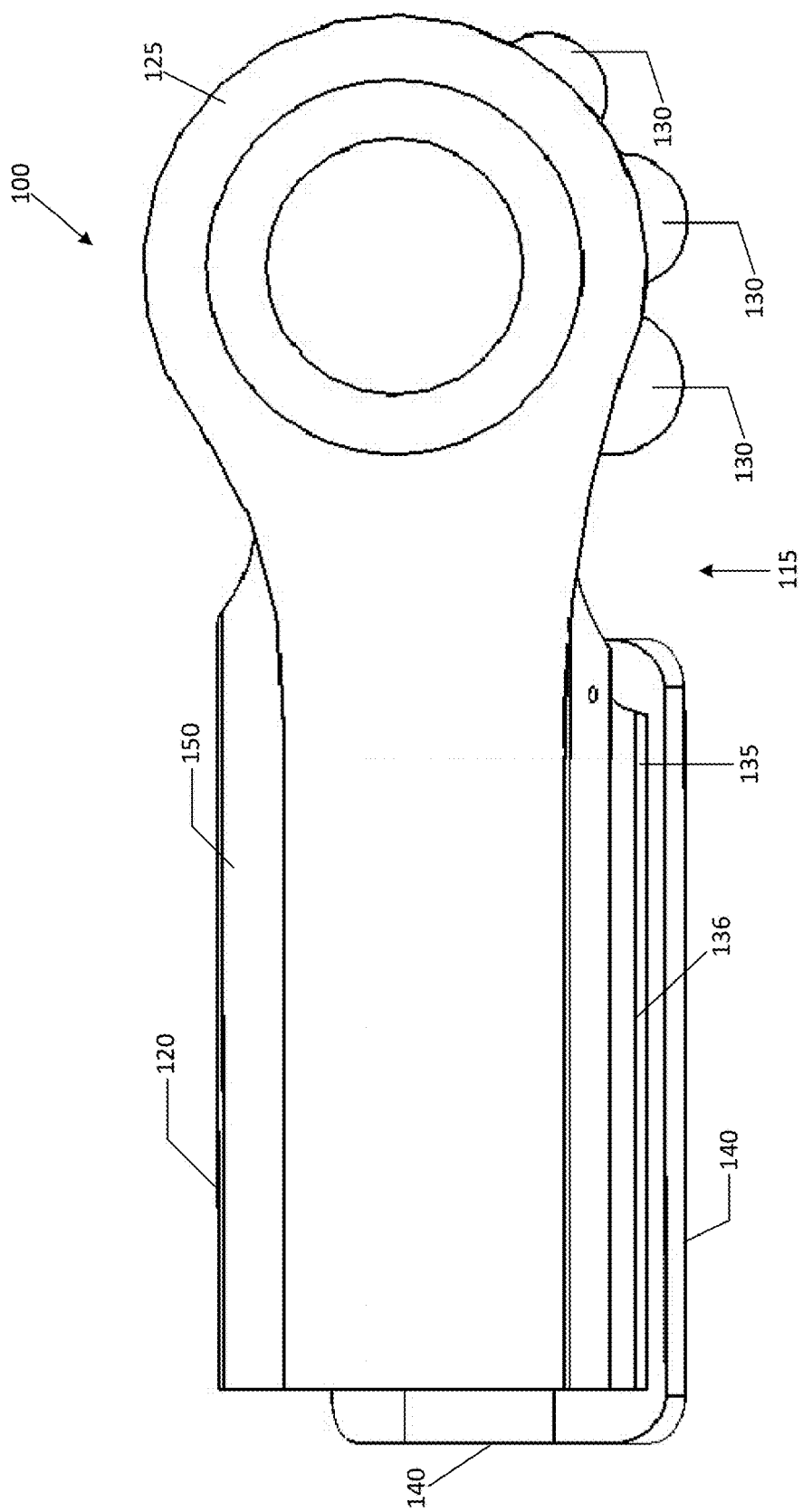
FIG. 1G is a bottom view of the controller according to various embodiments.

FIG. 1A is a diagram illustrating an example of an interaction between a UAV 300 and a controller 100 (in perspective view) according to various embodiments. FIG. 1B is a front view of the controller 100 according to various embodiments. FIG. 1C is a back view of the controller 100 according to various embodiments. FIG. 1D is a first side view of the controller 100 according to various embodiments. FIG. 1E is a second side view of the controller 100 according to various embodiments. FIG. 1F is a top view of the controller 100 according to various embodiments. FIG. 1G is a bottom view of the controller 100 according to various embodiments.

Referring to FIGS. 1A-1G, the controller 100 may include at least a first portion 120 for securing to the user and a first controller 110 for controlling at least one aspect of an UAV 300. The first controller 110 may be arranged on a second portion 125 of the controller 100. A controller body 150 may be a structure or support member for supporting various components of the controller 100. The controller body 150 may include at least the first portion 120 and the second portion 125. The first portion 120 and the second portion 125 may be adjacent (abutting) to one another in some embodiments. The second portion 125 may extend from the first portion 120. In other embodiments, the first portion 120 and the second portion 125 may be separated by other components of the controller 100.

The first portion 120 may include any suitable securing element that can secure to a body part of the user to allow both hands of the user to be free. As shown in the non-limiting example presented in FIGS. 1A-1G, the first portion 120 may be configured as a tubular sleeve or arm brace for receiving at least a portion of a first arm (e.g., a first forearm) of the user. The first portion 120 may have a C-shaped cross-section with an interior volume 122. When the first arm of the user is received in the interior volume 122 defined by the cross-section, the first arm may hold or otherwise support the first portion 120, and thus the controller 100. That is, when the first arm is received in the interior volume 122, the controller 100 may be completely supported without a second hand/arm, other body part, article of clothing, surface (e.g., desktop, wall, tree, and the like), and the like. The first portion 120 may be configured to allow the user to couple to the first portion 120 by extending the first arm/hand into the space from an end opening of the first portion 120 or from an opening in the cross-section. In other embodiments, the first portion 120 may have another suitable cross-section (e.g., a ring-shaped or oval-shaped cross-section) configured to hold the first arm of the user.

Figure 2:
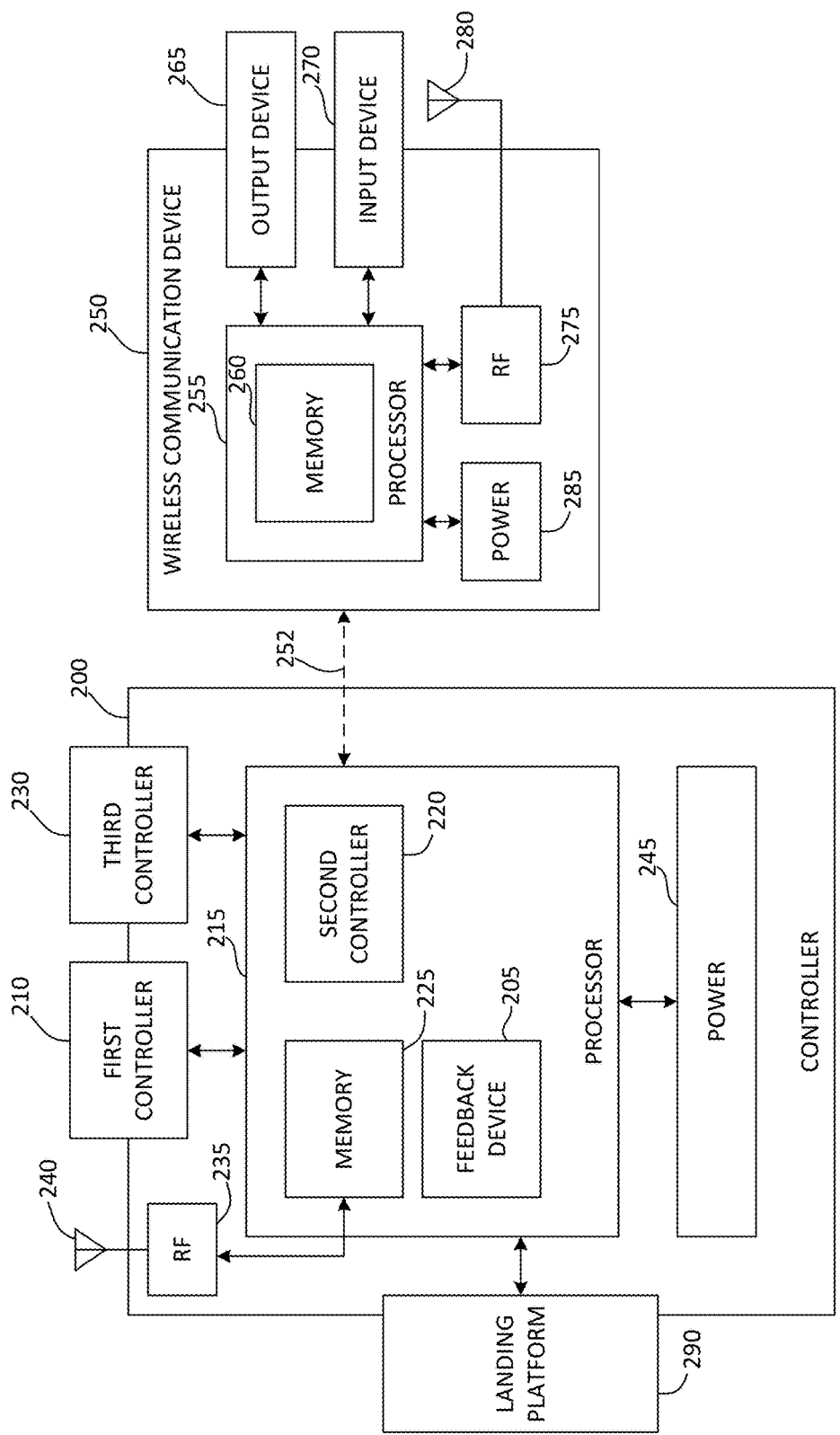
FIG. 2 is a block diagram illustrating an example of the controller for controlling various aspects of the UAV according to some embodiments.

A length and/or size of the first portion 120 may be configured to securely couple to the first arm of the user such that the entire controller 100 may be portable to the user by the first portion 120 only. The first hand (associated with the first arm on which the first portion 120 is coupled to) and a second hand (associated with a second arm not coupled to the first portion 120) of the user may be free to interact with the components of the controller 100. That is, neither the first hand nor the second hand (or fingers associated therewith) may need to carry or otherwise hold any part of the controller 100 for the controller 100 to be portable. The first portion 120 may be securely coupled to the first arm such that when the user interacts with or manipulates the first controller 110, second controller (220 of FIG. 2), third controller 130, and fourth controller (e.g., an input device 270 of FIG. 2), the controller 100 and a wireless communication device 140 does not move with respect to the first arm. The fingers and wrist of the first hand may freely operate one or more of the various controllers 110, 220 (FIG. 2), 130, and 270 (FIG. 2).

In some embodiments, the first portion 120 may be configured to cover the first arm of the user up to a wrist of the first arm, leaving the fingers and the wrist of the first arm free to operate the first controller 110. For example, the second portion 125 may extend away from the first portion 120 to form a space 115 between the first portion 120 and the first controller 110 for the wrist of the first arm. In other words, the first portion 120 and the first controller 110 may be spaced apart and non-abutting to form a sufficient space (e.g., the space 115) for allowing the wrist of the first arm to freely move. The first controller 110 may be moved by fingers and/or palm of the first arm in the manner described herein to control various aspect of the UAV 300. The first portion 120 and the second portion 125 may be different portions. In some embodiments, the second portion 125 may be configured to contact the wrist and/or the first hand. In other embodiments, the second portion 125 may not contact the wrist or the first hand.

In other embodiments, the first portion 120 may include any suitable securing member(s) such as, but not limited to, a strap, string, Velcro, clamp, elastic fastener, and/or the like to secure the controller 100 to the first arm or another body part of the user such that the hand, fingers, palm, and wrist of the first arm may freely operate the first controller 110 when the first portion 120 is secured to the user. In some embodiments, the first portion 120 may be configured to couple to an article of clothing (e.g., shirt sleeve, button, belt, and/or the like) of the user such that the hand, fingers, palm, and wrist of the first arm may freely operate the first controller 110 when the first portion 120 is secured to the article of clothing of the user.

In some embodiments, the first portion 120 may be configured to be ambidextrous. For example, the first portion 120 may be configured to be coupled to either a right arm or a left arm. Either the left or right arm may be the first arm. The first portion 120 may include adjustable securing members (e.g., with adjustable fits or sizes) to fit different sizes of the first arm. A sliding gadget, adjustable strap, retractable members, cushions (e.g., memory foam), paddings, and/or the like may be included to allow adjustments to the size and length of the first portion so that the first portion 120 can be securely fastened to the first arm without any movements therebetween.

As illustrated in the non-limiting example of FIGS. 1A-1G, the first controller 110 may be a joystick or movable knob. In other examples, the first controller 110 may be any suitable interactive element or operator (e.g., at least one of a button, wheel, mouse, level, slider, touch screen, knob, joystick, switch, trackball, and/or the like) configured to receive user input of the user when the controller 100 is secured to the user via the first portion 120. The user input may correspond to manipulations and interactions of the first controller 110 by the fingers and/or palm of the first arm, driven by the wrist.

In some embodiments, the controller 100 may include at least one second controller (e.g., a second controller 220 of FIG. 2) for controlling additional aspects of the UAV 300. The second controller may be embedded into the controller 100 or arranged external to the controller 100. The second controller may receive user input based on motion of the controller 100 as the controller 100 is being moved by the user (e.g., by the first arm of the user) in the manner described.

In some embodiments, the controller 100 may include at least one third controller 130 for controlling additional aspects of the UAV 300. The third controller 130 may be arranged on any part of the controller body 150. Illustrating with a non-limiting example, the third controller 130 may be arranged on the second portion 125. In other examples, the third controller 130 may be arranged on the first portion 120 or any other part of the controller body 150. Examples of the third controller 130 may include, but not limited to, at least one of a button, wheel, mouse, level, slider, touch screen, knob, joystick, switch, trackball, and/or the like for receiving user input. In some embodiments, the third controller 130 may be positioned such that at least one finger of the first arm can interact (e.g., can reach and manipulate) the third controller 130.

Illustrating with a non-limiting example, a thumb of the first hand may reach and manipulate the third controller 130 when the first arm is securely coupled to the first portion 120. Meanwhile, the fingers and/or palm of the first hand may interact with the first controller 110. Thus, in some embodiments, the first hand of the user may interact with the first controller 110 and the third controller 130, and the first arm of the user may interact with the second controller. Accordingly, the controller 100 may allow the user to interact with the first controller 110, the second controller, and the third controller 130 with one arm (e.g., the first arm and the first hand). In other embodiments, The second hand of the user may interact with the third controller 130 while the first hand and/or the first arm of the user may interact with the first controller 110 and the second controller.

The controller body 150 may include a third portion 135 for coupling to or otherwise supporting wireless communication device 140 or other control device. The third portion 135 may include at least one securing member such as, but not limited to, at least one of a strap, string, Velcro, clamp, clip, elastic fastener, magnet, and/or the like to detachably couple to the wireless communication device 140. The third portion 135 may include at least a platform 136 for stabilizing and supporting the wireless communication device 140. The third portion 135 may include at least one electrical connection (e.g., Universal Serial Bus (USB), micro-USB, mini-USB, USB type B, USB type C, lighting connector, and/or the like) to electrically couple the wireless communication device 140 and the controller 100 for power transfer and/or data transfer. An example of the electrical connection may be an electrical connection 252 (FIG. 2). In other embodiments, the third portion 135 may not include any electrical connection with the wireless communication device 140. In some embodiments, the third portion 135 may be configured such that when the wireless communication device 140 is attached to the third portion 135 and when the first portion 120 is secured to the first arm of the user, the user may be able to view a display (e.g., an output device 265 of FIG. 2) for information related to the UAV 300.

In some embodiments, the third portion 135 may abut the first portion 120. In other embodiments, the third portion 135 may be located at any other part of the controller body 150. In various embodiments, the third portion 135 is arranged such that the wireless communication device 140 (when attached to the third portion 135) generally does not extend over the space 115 to allow the wrist and the first hand to freely operate the first controller 110 and/or the third controller 130. The wireless communication device 140 may enable control (e.g., a fourth controller) of additional aspects of the UAV 300 in the manner described. The second hand of the user may interact with the fourth controller.

FIG. 2 is a block diagram illustrating an example of a controller 200 for controlling various aspects of the UAV 300 of FIG. 1A according to some embodiments. Referring to FIGS. 1A-2, the controller 200 may correspond to the controller 100. The controller 200 may include at least one of a first controller 210, second controller 220, and third controller 230 for receiving user input controlling the various aspects of the UAV 300 according to some embodiments. The first controller 210 may correspond to the first controller 110. The third controller 230 may correspond to the third controller 130.

The controller 200 may include a processor 215 configured to execute functions of the controller 200 as described herein. According to some embodiments, the processor 215 may be a general-purpose processor. The processor 215 may include any suitable data processing device, such as, but not limited to, a microprocessor, Central Processor Unit (CPU), or custom hardware. In the alternative, the processor 215 may be any suitable electronic processor, controller, microcontroller, or state machine. The processor 215 may also be implemented as a combination of computing devices (e.g., a combination of a Digital Signal Processor (DSP) and a microprocessor, a plurality of microprocessors, at least one microprocessor in conjunction with a DSP core, or any other suitable configuration).

The processor 215 may include or be coupled to a memory 225. The memory 225 may store processor-readable instructions for the processor 215 to receive user input for controlling the various aspects of the UAV 300, translating the user input into control data based on correspondence and mapping, and transmitting control data to the UAV 300 (e.g., via a Radio Frequency (RF) resource or a radio module 235). According to some embodiments, the memory 225 may be a non-transitory processor-readable storage medium that stores processor-executable instructions. The memory 225 may include any suitable internal or external device for storing software and data. Examples of the memory 225 may include, but are not limited to, Random Access Memory (RAM), Read-Only Memory (ROM), floppy disks, hard disks, dongles, or other Recomp Sensor Board (RSB) connected memory devices, or the like. The memory 225 may store an operating system (OS), user application software, and/or executable instructions. The memory 225 may also store application data, such as, but not limited to, an array data structure.

The second controller 220 may be embedded within the controller 200 or arranged external to the controller 200. The second controller 220 may include sensors for detecting motion of the controller 200. The second controller 220 may send user input detected by the second controller 220 to the processor 215 for translation into control data. In some embodiments, the second controller 220 may include at least one accelerometer, gyroscope, or other sensors that are configured to determine a direction, acceleration, speed, and/or the like with which the user is moving the controller 200. Illustrating with a non-limiting example, the second controller 220 may include an Inertial Measurement Unit (IMU). The IMU may include at least three accelerometers, three gyroscopes, and a magnetometer for detecting changes in the directions of translation (by virtue of the accelerometers) and in the directions of rotation (by virtual of the gyroscopes). Accordingly, the IMU may provide detection of the movement of the controller 200 in 6 DOF. In other embodiments, the second controller 220 may be implemented with other combinations of accelerometers and/or gyroscopes to detect movement of the controller 200 up to 6 DOF. In a non-limiting example, the second controller 220 may include three accelerometers for detecting movement of the controller 200 in three directions of translation. In another non-limiting example, the second controller 220 may include three gyroscopes for detecting movement of the controller 200 in three directions of rotation.

In some embodiments, the first controller 210 may provide for control up to 6 DOF. The second controller 220 may provide for control up to 6 DOF. With at least a combination of the first controller 210 and the second controller 220, the controller 200 may provide for control up to 12 DOF. This allows one of the first controller 210 and second controller 220 to control all flight aspects (e.g., throttling, yawing, pitching, and rolling) of the UAV 300, while allowing another one of the first controller 210 and second controller 220 to control a camera (e.g., a camera 340 or gimbal associated with the camera 340) of the UAV 300. The third controller 230 and/or a wireless communication device 250 (when electrically coupled to the controller 200) may provide additional control of additional aspects of the UAV 300.

The processor 215 may use the radio module 235 to conduct wireless communications with the UAV 300. The radio module 235 may be configured to transmit the control data to the UAV 300 and receive feedback data from the UAV 300. The radio module 235 may be coupled to an antenna 240 for performing the transmission and reception functions. The radio module 235 may include interface software, hardware, or combinations thereof, for communication with the UAV 300. The radio module 235 may include hardware such as network modems, wireless receiver or transceiver electronics, and/or software that provide wired or wireless communication links.

In some embodiments, the processor 215 may be coupled to a feedback device 205 for providing feedback to the user. Illustrating with a non-limiting example, the feedback device 205 may include a speaker for providing audio feedback. Illustrating with another non-limiting example, the feedback device 205 may include a display screen for providing visual feedback. Illustrating with another non-limiting example, the feedback device 205 may include at least one vibration motors or servos for providing tactile or force feedback.

In some embodiments, the feedback may be triggered by feedbacks signals received (via the radio module 235) from the UAV 300, received (via an electrical connection 252) from the wireless communication device 250, and/or generated by the processor 215. Illustrating with a non-limiting example, the UAV 300 may include sensors (e.g., the camera 340, navigation unit 325, gyro/accelerometer unit 327, avionics module 329 and/or the like of FIG. 3D) for optical obstacle avoidance, navigation, and/or hazard identification. In response to detecting an imminent collision, detecting that the UAV 300 being off-course, or detecting present danger, the UAV 300 may transmit the feedback signals corresponding to such events to the controller 200. The controller 200, upon receiving the feedback signals, may provide feedback to the user via the feedback device 205.

For instance, in response to receiving feedback signals concerning imminent collision, the feedback device 205 may provide feedback based on a direction and distance of the imminent collision. If the feedback signals indicate imminent collision with an object (e.g., a wall, building, another UAV, or the like) in a first direction with respect to the UAV 300, the feedback device 205 may provide feedback (e.g., vibrate) to the user in a direction corresponding to the first direction to notify the user of the imminent collision in the first direction. If the feedback signals indicate that the UAV 300 is off-course and need to fly in a first direction with respect to the UAV 300 to return to the course, the feedback device 205 may provide feedback to the user in a direction corresponding to the first direction to notify the user of the appropriate course. If the feedback signals indicate that the UAV 300 is being shot with bullets from a first direction with respect to the UAV 300, the feedback device 205 may provide feedback to the user in a direction corresponding to the first direction to notify to the user of the direction of harm. In some embodiments, the closer the UAV 300 may be to the object, the stronger the feedback (e.g., vibration, sound, visual indicator, and/or the like) may become, vice versa.

In some embodiments, the controller 200 may include a landing platform 290 for the UAV 300 to land. The landing platform 290 may be located at any suitable portion of the controller body 150. The landing platform 290 may include charging apparatuses for charging the UAV 300 in a wireless or wired fashion. The controller 200 may include a power module 245 for providing power to the controller 200 and/or the landing platform 290. In some embodiments, the landing platform 290 may include a beacon for communicating with the navigation unit 325 and/or the radio module 330 of the UAV 300 (FIG. 3D) to assist in landing of the UAV 300. Accordingly, landing the UAV 300 on the landing platform 290 or on another landing pad may need only one hand (e.g., the first hand) to operate the controller 200, leaving the other hand free for other tasks. In particular embodiments, the landing platform 290 may be the platform on which the wireless communication device 140, 250 is supported while the UAV 300 is in use.

In some embodiments, the controller 200 may be electrically coupled to the wireless communication device 250 via the electrical connection 252. The electrical connection 252 may be a part of the third portion 135. The wireless communication device 250 may be a mobile smart phone (such as, but not limited to an iPhone™, an Android™ phone, or the like), smart pad, laptop computer, and/or the like. The wireless communication device 250 may include at least a processor 255 configured to execute functions of the wireless communication device 250 as described herein. According to some embodiments, the processor 255 may be a general-purpose processor. The processor 255 may include any suitable data processing device, such as, but not limited to, a microprocessor, CPU, or custom hardware. In the alternative, the processor 255 may be any suitable electronic processor, controller, microcontroller, or state machine. The processor 255 may also be implemented as a combination of computing devices (e.g., a combination of a DSP and a microprocessor, a plurality of microprocessors, at least one microprocessor in conjunction with a DSP core, or any other suitable configuration). Various functions of the controller 200 or the communication device 250 may be performed by the processor 215, the processor 255, or both.

The processor 255 may include or be coupled to a memory 260. The memory 260 may store processor-readable instructions for the processor 255. According to some embodiments, the memory 260 may be a non-transitory processor-readable storage medium that stores processor-executable instructions. The memory 260 may include any suitable internal or external device for storing software and data. Examples of the memory 260 may include, but are not limited to, RAM, ROM, floppy disks, hard disks, dongles, or other RSB connected memory devices, or the like. The memory 260 may store an OS, user application software, and/or executable instructions. The memory 260 may also store application data, such as, but not limited to, an array data structure.

The wireless communication device 250 may have a power module 285 such as, but not limited to, the power module 245. The wireless communication device 250 may have a radio module 275 and antenna 280 such as, but not limited to, the radio module 235 and antenna 240, respectively. The radio module 275 may be in communication with a radio module 330 (FIG. 3D) of the UAV 300. In some embodiments, the radio module 275 may be configured to be in communication with the radio module 235 of the controller 200 (in lieu of or in addition to the electrical connection 252) for transfer of data therebetween.

In some embodiments, each of the controller 200 and the wireless communication device 250 may have its own respective processor 215 or 255, memory 225 or 260, radio module 235 or 275, and power module 245 or 285. In other embodiments, one or more of a processor, memory, radio module, or power module may be shared between the controller 200 and the wireless communication device 250. That is, one or more of the processor 215, memory 225, radio module 235, and power module 245 may be used by the wireless communication device 250, or one or more of the processor 255, memory 260, radio module 275, and power module 285 may be used by the controller 200. The electrical connection 252 may be utilized for communication of data between the shared component(s). Thus, the controller 200 may use existing hardware on the wireless communication device 250, vice versa.

The wireless communication device 250 may include an output device 265 coupled to the processor 255. The output device 265 may include at least one display device for displaying information (e.g., text, map, navigation chart, way points, notifications, and/or the like concerning the UAV 300) to the user. The output device 265 may include any suitable device that provides a human-perceptible visible signal, audible signal, tactile signal, or any combination thereof, including, but not limited to a touchscreen, Liquid Crystal Display (LCD), Light Emitting Diode (LED), Cathode Ray Tube (CRT), plasma, or other suitable display screen, audio speaker or other audio generating device, combinations thereof, or the like.

In some embodiments, the wireless communication device 250 may include at least one input device 270 that may provide an interface for accepting user input of the user. The input device 270 may include any suitable input device including, but not limited to, one or more of a manual operator (such as, but not limited to a switch, button, wheel, touchscreen (which may be part of a display device), knob, slider, keyboard, mouse, or the like), microphone, camera, various sensors, accelerometers, gyroscopes, and/or the like. The input device 270 may be the fourth controller that can provide additional control of additional aspects of the UAV 300. The second hand of the user may be used to interact, via the input device 270, with the maps, navigation information, way points, notifications, and/or the like presented by the output device 265. As the user holds up the wireless communication device 250 (and the controller 200 to which the wireless communication device 250 is attached) with the first arm, the user may interact with the fourth controller with the second hand of the user. The input device 270 may receive user input for controlling one or more of a flight mode of the UAV 300, at least one sensor of the UAV 300, at least one camera of the UAV 300, orientation of the UAV 300, software settings on the UAV 300, landing mode of the UAV 300, take-off configurations of the UAV 300, or payload settings of the UAV 300.

In some embodiments, the processor 255 may translate the user input into control data and send the control data to the UAV 300 via the radio module 275. In some embodiments, the processor 255 may relay the control data or the user input to the processor 215 of the controller 200. The processor 215 may translate the user input into the control data, if user input is sent. The processor 215 may send the control data to the UAV 300 via the radio module 235.

In some embodiments, the input device 270 may include a controller such as, but not limited to, the second controller 220. When the wireless communication device 250 is attached to the controller 200 such that the wireless communication device 250 does not move with respect to the controller 200, the second controller 220 may be alternatively be a part of the input device 270 (instead of being a part of the controller 200) given that movement detected by a component of the controller 200 may be likewise detected by the wireless communication device 250. In such embodiments, the second controller 220 of the input device 270 may be controlled by the first arm, as the second arm is not needed to move the wireless communication device 250, which may be attached to and moved together with the controller 200.

In various embodiments, the controller 200 may include an output device such as, but not limited to, the output device 265 and/or an input device such as, but not limited to, the input device 270. Particularly, the controller 200 may include a display screen or touch screen (such as the output device 265) locally on the controller 200 for outputting information related to the UAV 300.

Figure 3A:
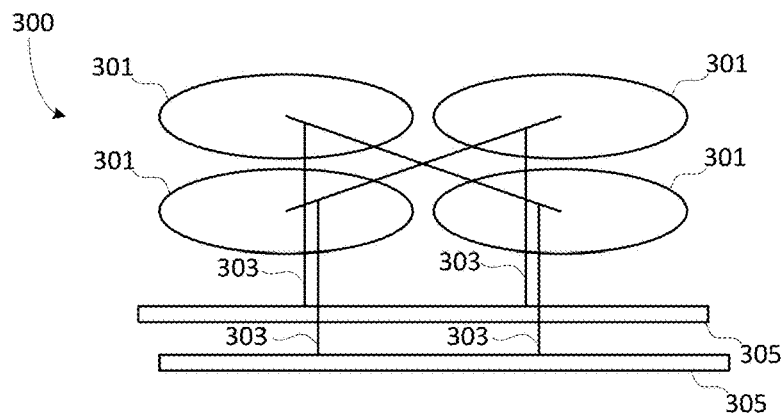
FIG. 3A is a schematic diagram illustrating an example of the UAV suitable for control by the controller according to various embodiments.
Figure 3B:
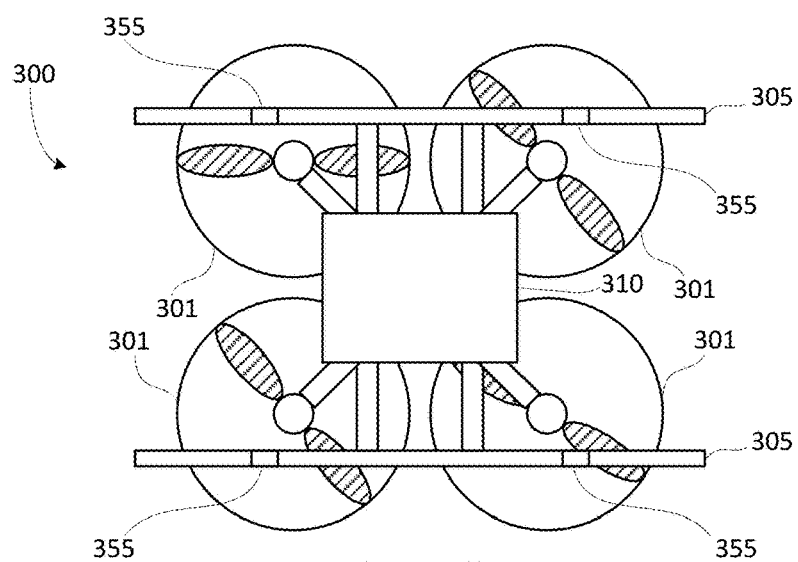
FIG. 3B is a schematic diagram illustrating an example of the UAV suitable for control by the controller according to various embodiments.
Figure 3C:
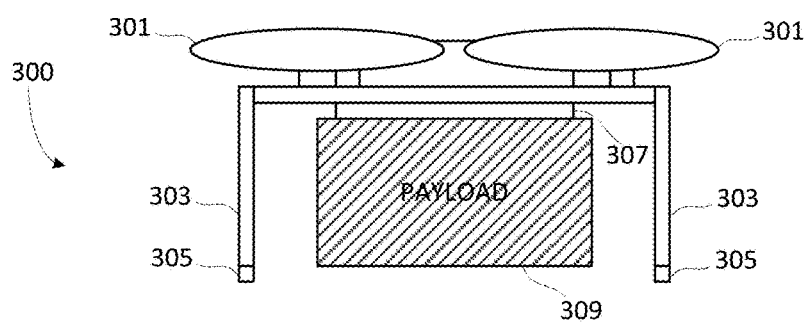
FIG. 3C is a schematic diagram illustrating an example of the UAV suitable for control by the controller according to various embodiments.
Figure 3D:
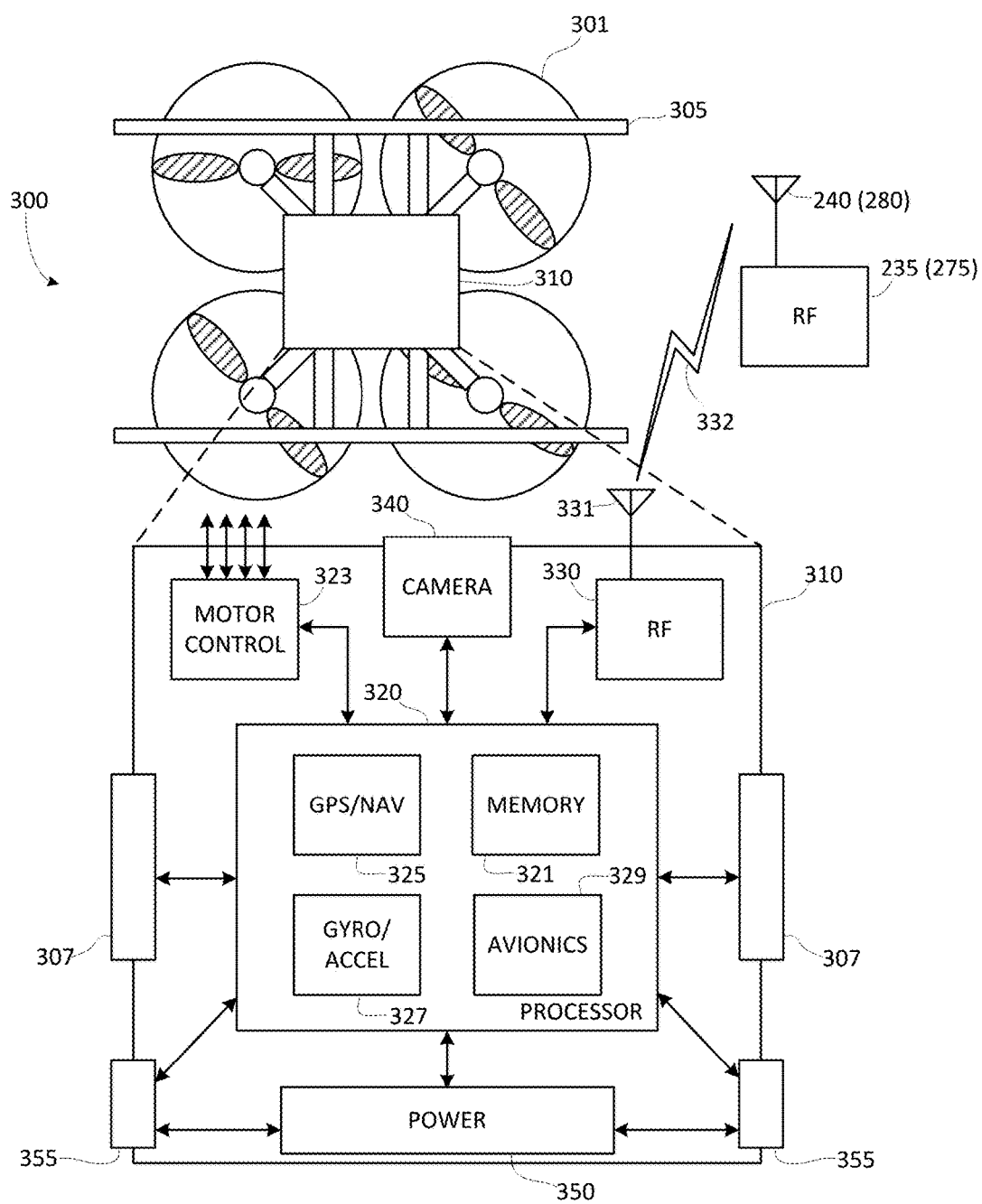
FIG. 3D is a schematic diagram illustrating an example of the UAV suitable for control by the controller according to various embodiments.

FIG. 3A is a schematic diagram illustrating an example of the UAV 300 suitable for control by the controller 200 of FIG. 2 according to various embodiments. FIG. 3B is a schematic diagram illustrating an example of the UAV 300 suitable for control by the controller 200 of FIG. 2 according to various embodiments. FIG. 3C is a schematic diagram illustrating an example of the UAV 300 suitable for control by the controller 200 of FIG. 2 according to various embodiments. FIG. 3D is a schematic diagram illustrating an example of the UAV 300 suitable for control by the controller 200 of FIG. 2 according to various embodiments.

Referring to FIGS. 1A-3D, in some embodiments, the UAV 300 may include a number of rotors 301, frame 303, and landing skids 305. The frame 303 may provide structural support for the motors associated with the rotors 301, the landing skids 305 and may be sufficiently strong to support the maximum load weight for the combination of the components of the UAV 300 and, in some cases, a payload 309. For ease of description and illustration, some detailed aspects of the UAV 300 are omitted such as wiring, frame structure interconnects or other features that would be known to one of skill in the art. For example, while the UAV 300 is shown and described as having a frame 303 having a number of support members or frame structures, the UAV 300 may be constructed using a molded frame in which support is obtained through the molded structure. In the illustrated embodiments, the UAV 300 has four of the rotors 301. However, more or fewer than four rotors 301 may be used.

In some embodiments, the landing skids 305 of the UAV 300 may be provided with landing sensors 355. The landing sensors 355 may be optical sensors, radio sensors, camera sensors, or other sensors. Alternatively or additionally, the landing sensors 355 may be contact or pressure sensors that may provide a signal indicating when the UAV 300 has made contact with a surface. In some embodiments, the landing sensors 355 may be adapted to provide the additional ability to charge a power module 350 when the UAV 300 is positioned on a suitable landing pad, such as through charging connectors. In some embodiments, the landing sensors 355 may provide additional connections with a landing pad, such as wired communication or control connections. The UAV 300 may further include a control unit 310 that may house various circuits and devices used to power and control the operation of the UAV 300, including motors for powering rotors 301, power module 350, radio module 330, and so on.

In some embodiments, the UAV 300 may be equipped with a payload-securing unit 307. The payload-securing unit 307 may include an actuator motor that drives a gripping and release mechanism and related controls that are responsive to a control signal to grip and release the payload 309 in response to commands from the control unit 310.

An example of the control unit 310 for the UAV 300 suitable for use with the various embodiments is illustrated in FIG. 3D. With reference to FIGS. 1A-3D, the control unit 310 may include a processor 320, radio module 330, and power module 350. The processor 320 may include or be coupled to a memory unit 321 and a navigation unit 325. The processor 320 may be configured with processor-executable instructions to control flight and other operations the UAV 300. Particularly, the processor 320 may control flight and other aspects of the UAV 300 based on control data received from the radio module 235 and/or the radio module 275.

The processor 320 may be coupled to the payload securing unit 307 and the landing sensors 355. The processor 320 may be powered from the power module 350, such as a battery. The processor 320 may be configured with processor-executable instructions to control the charging of the power module 350, such as by executing a charging control algorithm using a charge control circuit. Alternatively or additionally, the power module 350 may be configured to manage its own charging. The processor 320 may be coupled to a motor control unit 323 configured to manage the motors that drive the rotors 301.

Through control of the individual motors of the rotors 301, the UAV 300 may be controlled in flight as the UAV 300 progresses toward a destination. In some embodiments, the processor 320 may control the motor control 323 (e.g., the flight of the UAV 300) based on the control data received from the radio module 235, such as in an instance in which the UAV 300 is at least partially controlled manually by the user of the controller 200. The processor 320 may receive data from the navigation unit 325 and use such data to determine the present position and orientation of the UAV 300, as well as the appropriate course towards the destination. In some embodiments, the navigation unit 325 may include a Global Navigation Satellite System (GNSS) receiver system (e.g., one or more GPS receivers) enabling the UAV 300 to navigate using GNSS signals. Alternatively or in addition, the navigation unit 325 may be equipped with radio navigation receivers for receiving navigation beacon or other signals from radio nodes, such as navigation beacons (e.g., Very High Frequency (VHF) Omni Directional Radio Range (VOR) beacons), Wi-Fi access points, cellular network sites, radio station, etc. Additionally, the processor 320 and/or the navigation unit 325 may be configured to communicate with the radio module 235 and/or the radio module 275 through a wireless communication link 332 (e.g., a cellular data network) to receive data useful in navigation as well as provide real-time position reports.

An avionics module 329 coupled to the processor 320 and/or the navigation unit 325 may be configured to provide flight control-related information such as altitude, attitude, airspeed, heading and similar information that the navigation unit 325 may use for navigation purposes, such as dead reckoning between GNSS position updates. The avionics module 329 may include or receive data from a gyro/accelerometer unit 327 that provides data regarding the orientation and accelerations of the UAV 300 that may be used in navigation calculations.

The radio module 330 may be configured to receive navigation signals, such as beacon signals from restricted areas, signals from aviation navigation facilities, etc., and provide such signals to the processor 320 and/or the navigation unit 325 to assist in navigation. In some embodiments, the navigation unit 325 may use signals received from recognizable RF emitters (e.g., AM/FM radio stations, Wi-Fi access points, and cellular network base stations) on the ground. The locations, unique identifiers, single strengths, frequencies, and other characteristic information of such RF emitters may be stored in a database and used to determine position (e.g., via triangulation and/or trilateration) when RF signals are received by the radio module 330. Such a database of RF emitters may be stored in the memory unit 321 of the UAV 300, in a ground-based device (e.g., in the memory 225 or memory 260) or server in communication with the processor 320 via the wireless communication link 332, or in a combination of the memory unit 321 and the ground-based device or server.

Navigating using information about RF emitters may use any of a number of conventional methods. For example, upon receiving an RF signal via the radio module 330, the processor 320 may obtain the signals unique identifier (e.g., a Service Sector Identification (SSID), a Media Access Control (MAC) address, radio station call sign, cell ID, etc.), and use that information to obtain the ground coordinates and signal strength of the detected RF emitter from the database of RF emitter characteristics. If the database is stored in the onboard memory unit 321, the processor 320 may use the emitter identifier information to perform a table look up in the database. Alternatively or in addition, the processor 320 may use the radio module 330 to transmit the detected RF emitter identifier to a Location Information Service (LIS) server, which may return a location of the RF emitter obtained an RF emitter location database. Using the RF emitters coordinates and optionally the signal strength characteristics, the processor 320 (or the navigation unit 325) may estimate the location of the UAV 300 relative to those coordinates. Using locations of three or more RF emitters detected by the radio module 330, the processor may determine a more precise location via trilateration. Estimates of location based on received ground-based RF emitters may be combined with position information from a GNSS receiver to provide more precise and reliable location estimates than achievable with either method alone.

The processor 320 may use the radio module 330 to conduct wireless communications with a variety of wireless communication devices (e.g., the controller 200 and/or the wireless communication device 250), such as a beacon, server, smartphone, tablet, controller, or other devices with which the UAV 300 may be in communication. The bi-directional wireless communication link 332 may be established between transmit/receive antenna 331 of the radio module 330 and transmit/receive antenna 240 of the controller 200 (and/or the antenna 280 of the wireless communication device 250). The radio module 330 may be configured to support multiple connections with different devices (e.g., the controller 200 and the wireless communication device 250) having different radio access technologies. The UAV 300 may communicate with the controller 200 and/or the wireless communication device 250 through an intermediate communication link such as one or more network nodes or other communication devices.

In some embodiments, the radio module 330 may be configured to switch between a cellular connection and a Wi-Fi (or other local area network or personal area network) connection depending on the location and altitude of the UAV 300. For example, while in flight at an altitude designated for UAV traffic, the radio module 330 may communicate with a cellular infrastructure in order to maintain communications with a device (e.g., the controller 200 and/or the wireless communication device 250). An example of a flight altitude for the UAV 300 may be at around 400 feet or less, such as may be designated by a government authority for UAV flight traffic. At this altitude, it may be difficult to establish communication with the controller 200 and/or the wireless communication device 250 using short-range radio communication links (e.g., Wi-Fi). Therefore, communications with the controller 200 and/or the wireless communication device 250 may be established using cellular telephone networks while the UAV 300 is at flight altitude. Communication between the radio module 330 and the controller 200 (the wireless communication device 250) may transition to a short-range communication link (e.g., Wi-Fi or Bluetooth) when the UAV 300 moves closer to the controller 200 (the wireless communication device 250).

The UAV 300 may include the camera 340 coupled to the processor 320. The camera 340 may be arranged on a camera gimbal for movement. Examples of the camera 340 may include, but not limited to, a digital camera, stereo camera, video camera, and/or the like. The output of the camera 340 may be sent via the radio module 330 to the wireless communication device 250. The output device 265 may output the output data of the camera 340 via a display screen of the output device 265.

In response to receiving the control data from the radio module 235 of the controller 200 and/or the radio module 275 of the wireless communication device 250, the processor 320 of the UAV 300 may configure the relevant components of the UAV 300 based on to the control data. Illustrating with a non-limiting example, in response to receiving the control data related to the flight of the UAV 300, the processor 320 may control the motor control 323 to drive the rotors 301 based on the control data. The flight of the UAV 300 may include one or more of throttling, yawing, pitching, and/or rolling of the UAV 300.

Illustrating with another non-limiting example, in response to receiving the control data related to the flight mode of the UAV 300, the processor 320 may control the motor control 323, navigation unit 325, and/or avionics module 329 based on the control data. The flight mode of the UAV 300 may include an "altitude-hold" mode in which the processor 320 may configure the motor control 323 and the avionics module 329 to maintain a current altitude of the UAV 300 unless otherwise instructed. The flight mode may also include a "follow" mode in which the processor 320 may configure the motor control 323, navigation unit 325, and/or avionics module 329 to follow (to maintain relative distance of) a beacon or device (e.g., the controller 200, the wireless communication device 250, and/or the like). The flight mode may also include a "waypoint" mode in which the processor 320 may configure the motor control 323, navigation unit 325, and/or avionics module 329 to fly to at least one waypoint. The user may indicate a waypoint on via the input device 270 of the wireless communication device 250. Control data indicating the waypoint (e.g., with GPS coordinates) may be sent to the UAV 300 via the radio module 275 or the radio module 235. The processor 320 may subsequently configure the motor control 323, navigation unit 325, and/or avionics module 329 to fly to the waypoint identified by the coordinates included in the control data.

Illustrating with another non-limiting example, in response to receiving the control data related to the orientation of the UAV 300, the processor 320 may control the motor control 323, navigation unit 325, and/or avionics module 329 based on the control data. The orientation of the UAV 300 may refer to stabilizing the UAV 300 via the motor control 323 and/or avionics module 329. The orientation of the UAV 300 may additionally or alternatively refer to a relative position/orientation of the UAV 300 as the UAV 300 is flying in any suitable direction.

Illustrating with another non-limiting example, in response to receiving the control data related to the at least one sensor of the UAV 300, the processor 320 may control the navigation unit 325, gyro/accelerometer unit 327, and/or avionics module 329 based on the control data. The control data may correspond to switching the sensors on/off, calibrating the sensors, adjusting the position/orientation of the sensors, and/or the like.

Illustrating with another non-limiting example, in response to receiving the control data related to the camera 340 of the UAV 300, the processor 320 may control the camera settings (e.g., exposure, angle, perspective, filter, focus, and/or the like), positions, and/or orientations of the camera 340 based on the control data.

Illustrating with another non-limiting example, in response to receiving the control data related to software settings of the UAV 300, the processor 320 may modify instructions stored in the memory unit 321 based on the control data. Illustrating with another non-limiting example, in response to receiving the control data related to the landing mode or take-off configurations of the UAV 300, the processor 320 may control the landing sensors 355 based on the control data. Illustrating with another non-limiting example, in response to receiving the control data related to the payload settings of the UAV 300, the processor 320 may control the payload-securing unit 307 based on the control data.

Accordingly, the controller 200 may control various aspects of the UAV 300 with one or more of the first controller 210, second controller 220, third controller 230, or fourth controller (e.g., the input device 270). In some embodiments, the controller 200 may include one or more of the first controller 210, second controller 220, third controller 230, or fourth controller (e.g., the input device 270) in any suitable combination. In some embodiments, the controller 200 may include all of the first controller 210, second controller 220, third controller 230, or fourth controller (e.g., the input device 270).

Each of the first controller 210 and the second controller 220 may provide for control up to 6 DOF. Given that controlling the flight of the UAV 300 may require at least 4 DOF (e.g., one for each of throttling, yawing, pitching, and rolling), one of the first controller 210 and the second controller 220 may be configured to control the flight of the UAV 300. Given that controlling orientation and position of the camera 340 (e.g., on a camera gimbal) may require up to 6 DOF, another one of the first controller 210 or the second controller 220 may be configured to control the camera 340.

Illustrating with a non-limiting example, the first controller 210 may be configured to control flight of the UAV 300, while the second controller 220 may be configured to control the orientation and position of the camera 340. Illustrating with another non-limiting example, the first controller 210 may be configured to control the orientation and position of the camera 340, while the second controller 220 may be configured to control the flight of the UAV 300.

Figure 4A:
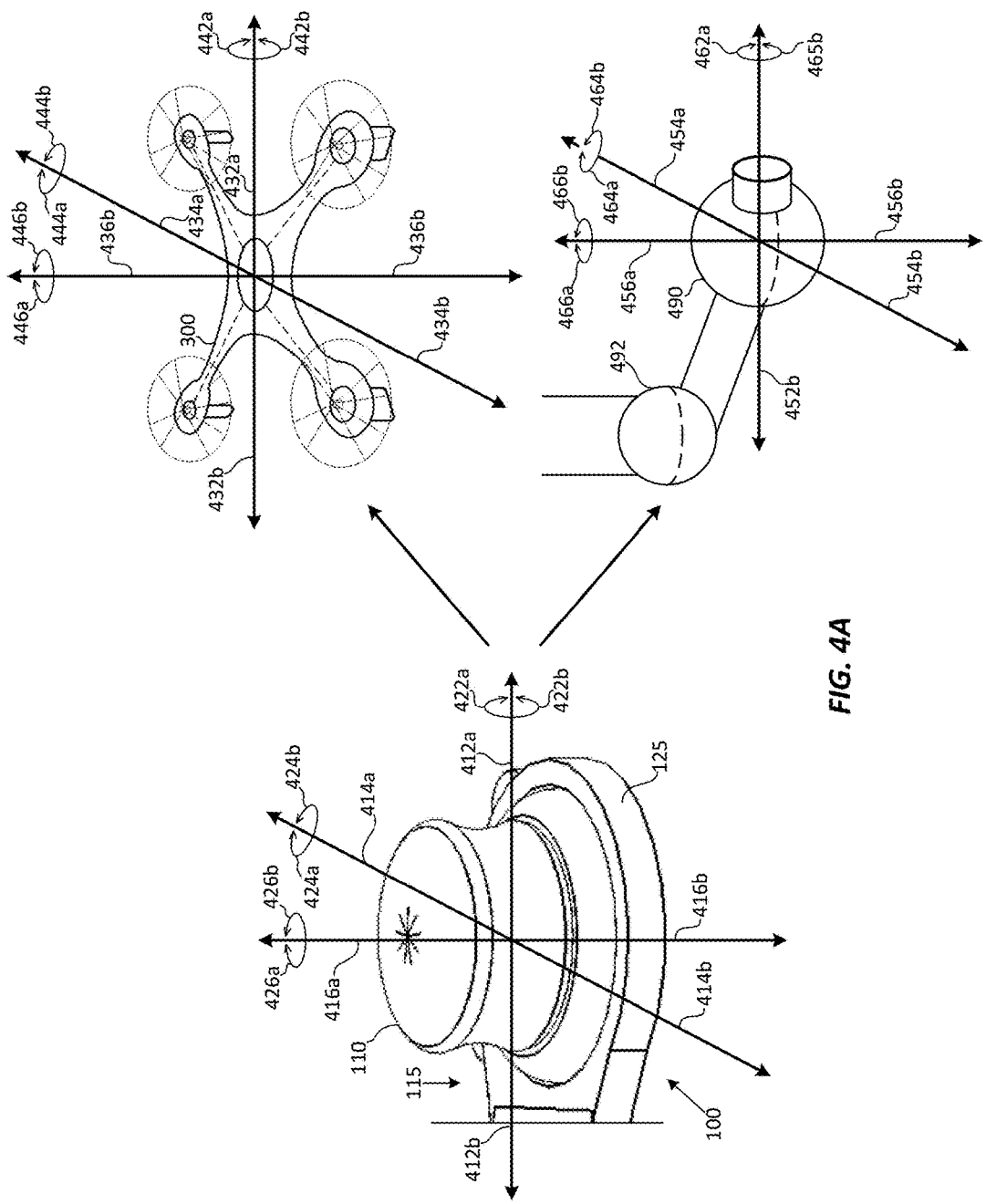
FIG. 4A is a schematic diagram illustrating an example of correspondence between manipulation of the first controller and the flight of the UAV, and an example of correspondence between manipulation of the first controller and the orientation/position of a camera of the UAV.

FIG. 4A is a schematic diagram illustrating an example of correspondence between manipulation of the first controller 110 (FIGS. 1A-1G) and the flight of UAV 300 (FIGS. 1A-1G, 3A-3D), and an example of correspondence between manipulation of the first controller 110 (FIGS. 1A-1G) and the orientation/position of a camera 490. Referring to FIGS. 1-4A, FIG. 4A shows a partial perspective view of the controller 100, including the first controller 110, the second portion 125 supporting the first controller 110, and the space 115 for the wrist of the first arm of the user. Other parts of the controller 100 may be omitted for clarity.

The first controller 110 may be manipulated or otherwise configured to move in up to six axes (6 DOF), including three axes of translation and three axes of rotation. For example, the first controller 110 may be moved in a first axis of translation in either direction 412a or 412b. The first controller 110 may be moved in a second axis of translation in either direction 414a or 414b. The first controller 110 may be moved in a third axis of translation in either direction 416*a* or 416*b*. The first controller 110 may be moved in a first axis of rotation in either direction 422*a* or 422*b*. The first controller 110 may be moved in a second axis of rotation in either direction 424*a* or 424*b*. The first controller 110 may be moved in a third axis of rotation in either direction 426*a* or 426*b*.

In some embodiments, the first axis of translation (with directions 412*a* and 412*b*) may be parallel to a longitudinal dimension of the controller 100. That is, the first controller 110 may be arranged in the direction 412*a* with respect to the first portion 120. The directions 412*a*-426*b* may be presented for illustrative purposes, and other conventions for defining the directions can be likewise implemented for correspondence or mapping with the movements of the UAV 300 or the movement of the camera 490.

In response to receiving user input associated with moving the first controller 110 in any of the directions 412*a*-426*b*, the processor 215 may translate the user input into control data and send the control data to the UAV 300 via the radio module 235. The processor 320 of the UAV 300, upon receiving the control data, may control the motor control 323 based on the control data in the manner described.

Illustrating with a non-limiting configuration, in response to detecting the first controller 110 being moved (pulled) in the direction 416*a*, the UAV 300 may be configured to fly in a direction 436*a* (e.g., increasing throttling for gaining altitude). In response to detecting the first controller 110 being moved (pushed) in the direction 416*b*, the UAV 300 may be configured to fly in a direction 436*b* (e.g., decreasing throttling for losing altitude). In this configuration, the third axis of translation (including the directions 416*a* and 416*b*) may correspond to throttling of the UAV 300 (increasing or decreasing altitude along the direction 436*a* or 436*b* of the UAV 300). In response to the UAV 300 being set in the "altitude-hold" mode (in which the UAV 300 may maintain its current altitude unless otherwise instructed), the UAV 300 may gain altitude when the first controller 110 is pulled up (or pushed down with relative reverse controls).

Illustrating with another non-limiting configuration, in response to detecting the first controller 110 being moved in the direction 422*a* or 422*b*, the UAV 300 may be configured to fly in a direction 442*a* or 442*b*, respectfully, for rolling. Alternatively, in response to detecting the first controller 110 being moved in the direction 422*a* or 422*b*, the UAV 300 may be configured to fly in the direction 442*b* or 442*a*, respectfully, for rolling with relative reverse controls. In this configuration, the first axis of rotation (including the directions 422*a* and 422*b*) may correspond to rolling of the UAV 300 along the direction 442*a* or 442*b* of the UAV 300.

Illustrating with another non-limiting configuration, in response to detecting the first controller 110 being moved in the direction 424*a* or 424*b*, the UAV 300 may be configured to fly in a direction 444*a* or 444*b*, respectfully, for pitching. Alternatively, in response to detecting the first controller 110 being moved in the direction 424*a* or 424*b*, the UAV 300 may be configured to fly in the direction 444*b* or 444*a*, respectfully, for pitching with relative reverse controls. In this configuration, the second axis of rotation (including the directions 424*a* and 424*b*) may correspond to pitching of the UAV 300 along the direction 444*a* or 444*b* of the UAV 300.

Illustrating with another non-limiting configuration, in response to detecting the first controller 110 being moved in the direction 426*a* or 426*b*, the UAV 300 may be configured to fly in a direction 446*a* or 446*b*, respectfully, for yawing. Alternatively, in response to detecting the first controller 110 being moved in the direction 426*a* or 426*b*, the UAV 300 may be configured to fly in the direction 446*b* or 446*a*, respectfully, for yawing with relative reverse controls. In this configuration, the third axis of rotation (including the directions 426*a* and 426*b*) may correspond to yawing of the UAV 300 along the direction 446*a* or 446*b* of the UAV 300.

In some embodiments, moving the first controller 110 in the direction 412*a* or 412*b* may correspond to the UAV 300 moving in the direction 432*a*, 432*b*, 444*a*, or 444*b* with any suitable mapping therebetween. In some embodiments, the direction 412*a* or 412*b* (in addition to the direction 424*a* or 424*b*) may correspond to the pitching of the UAV 300 in the direction 444*a* or 444*b*. In other embodiments, the direction 412*a* or 412*b* may correspond to the UAV 300 moving straight in the direction 432*a* or 432*b*.

In some embodiments, moving the first controller 110 in the direction 414*a* or 414*b* may correspond to the UAV 300 moving in the direction 434*a*, 434*b*, 442*a*, or 442*b* with any suitable mapping therebetween. In some embodiments, the direction 414*a* or 414*b* (in addition to the direction 422*a* or 422*b*) may correspond to the rolling of the UAV 300 in the direction 442*a* or 442*b*. In other embodiments, the direction 414*a* or 414*b* may correspond to the UAV 300 moving straight in the direction 434*a* or 434*b*.

In some embodiments, the first controller 110 may not provide correspondence between moving in the directions 412*a*, 412*b*, 414*a*, and/or 414*b* given that 4 DOF may be sufficient for flying some UAV.

The camera 490 may correspond to the camera 340. In some embodiments, the camera 490 may be in an initial orientation and position such that, when moved in any of the directions 452*a*-466*b*, the output visual data may be simultaneously shown (subject to latency) on the output device 265, enabling a first-person view and control of the camera 490. The camera 490 may be mounted on a gimbal 492 or another suitable structure that may provide movement of the camera 490 in the directions 452*a*-466*b*. Moving the first controller 110 in the first, second, and third axes of translation (e.g., in directions 412*a*, 412*b*, 414*a*, 414*b*, 416*a*, 416*b*) may correspond to the camera 490 being moved (by the gimbal 492) in the directions 452*a*, 452*b*, 454*a*, 454*b*, 456*a*, 456*b* with any suitable mapping therebetween. Moving the first controller 110 in the first, second, and third axes of rotation (e.g., in directions 422*a*, 422*b*, 424*a*, 424*b*, 426*a*, 426*b*) may correspond to the camera 490 being moved (by the gimbal 492) in the directions 462*a*, 462*b*, 464*a*, 464*b*, 466*a*, 466*b* with any suitable mapping therebetween.

Figure 4B:
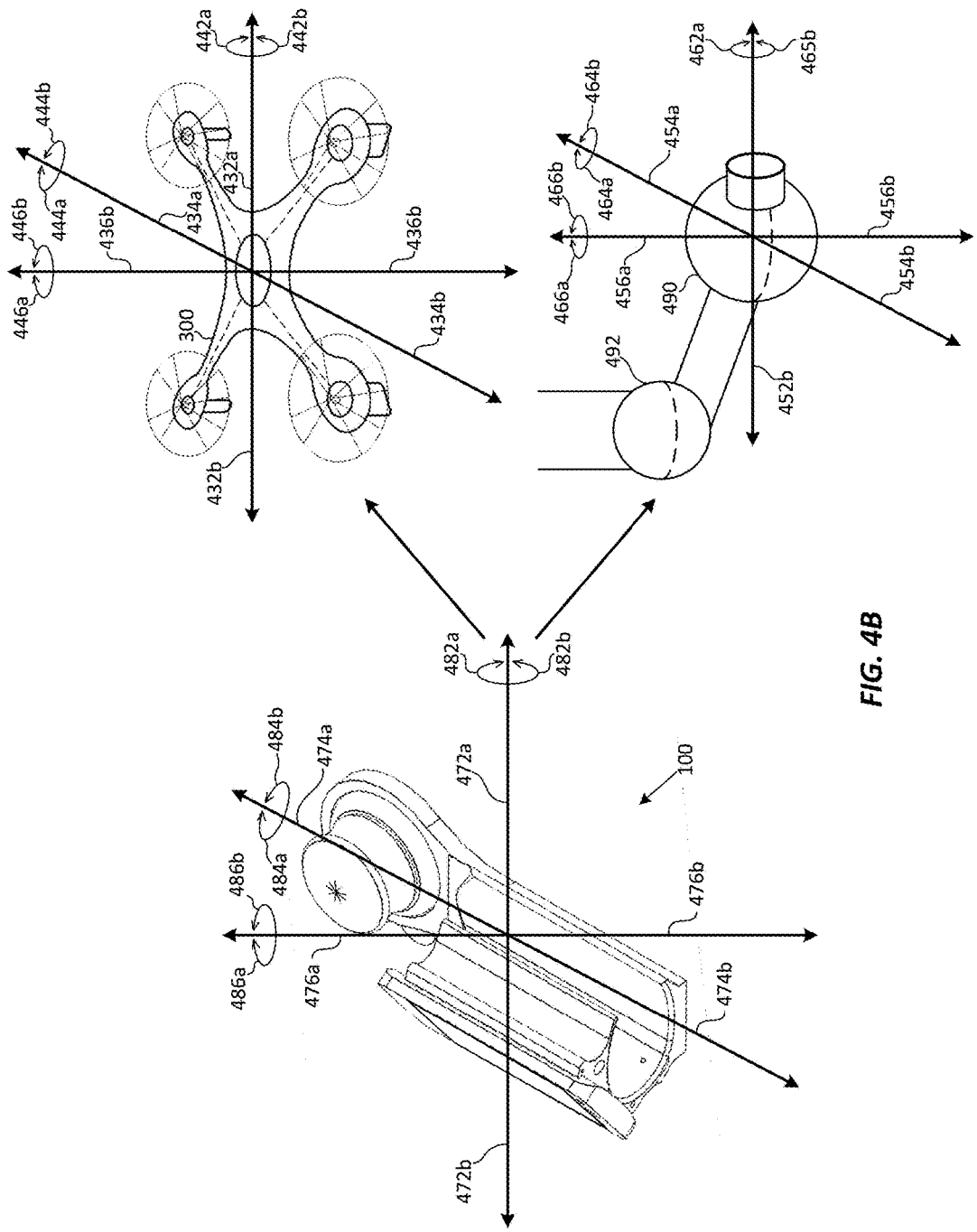
FIG. 4B is a schematic diagram illustrating an example of correspondence between manipulation of the second controller and the flight of the UAV, and an example of correspondence between manipulation of the second controller and the orientation/position of the camera of the UAV.

FIG. 4B is a schematic diagram illustrating an example of correspondence between manipulation of the second controller 220 (FIG. 2) and the flight of UAV 300 (FIGS. 1A-1G, 3A-3D), and an example of correspondence between manipulation of the second controller 220 (FIG. 2) and the orientation/position of the camera 490. FIG. 4B shows a perspective view of the controller 100 with the second controller 220 embedded (not shown). Referring to FIGS. 1-4B, motion of the controller 100 may correspond to motion detected by the second controller 220.

The controller 100 (and the second controller 220 embedded therein for sensing motion of the controller 100) may be manipulated or otherwise moved in up to six axes (6 DOF), including three axes of translation and three axes of rotation. For example, the controller 100 may be moved in a first axis of translation in either direction 472*a* or 472*b*. The controller 100 may be moved in a second axis of translation in either direction 474*a* or 474*b*. The controller 100 may be moved in a third axis of translation in either direction 476*a* or 476*b*. The controller 100 may be moved in a first axis of rotation in either direction 482*a* or 482*b*. The controller 100 may be moved in a second axis of rotation in either direction 484*a* or 484b. The controller 100 may be moved in a third axis of rotation in either direction 486a or 486b.

In some embodiments, the second axis of translation (with directions 474a and 474b) may be parallel to the longitudinal dimension of the controller 100 and/or the second axis of translation of the first controller 110 (directions 414a and 414b). The directions 472a-486b may be presented for illustrative purposes, and other conventions for defining the directions can be likewise implemented for correspondence or mapping with the movements of the UAV 300 or the movement of the camera 490.

In response to receiving user input associated with moving the controller 100 in any of the directions 472a-486b by moving the first arm, the processor 215 may translate the user input (obtained by the second controller 220) into control data and send the control data to the UAV 300 via the radio module 235. The processor 320 of the UAV 300, upon receiving the control data, may control the motor control 323 based on the control data.

Illustrating with a non-limiting configuration, in response to detecting the controller 100 being moved (elevated) in the direction 476a, the UAV 300 may be configured to fly in a direction 436a (e.g., increasing throttling for gaining altitude). In response to detecting the controller 100 being moved (de-elevated) in the direction 476b, the UAV 300 may be configured to fly in a direction 436b (e.g., decreasing throttling for losing altitude). In this configuration, the third axis of translation (including the directions 476a and 476b) may correspond to throttling of the UAV 300 for increasing or decreasing altitude along the direction 436a or 436b of the UAV 300.

Illustrating with another non-limiting configuration, in response to detecting the controller 100 being moved in the direction 482a or 482b, the UAV 300 may be configured to fly in the direction 442a or 442b, respectfully, for rolling. Alternatively, in response to detecting the controller 100 being moved in the direction 482a or 482b, the UAV 300 may be configured to fly in the direction 442b or 442a, respectfully, for rolling with relative reverse controls. In this configuration, the first axis of rotation (including the directions 482a and 482b) may correspond to rolling of the UAV 300 along the direction 442a or 442b of the UAV 300.

Illustrating with another non-limiting configuration, in response to detecting the controller 100 being moved in the direction 484a or 484b, the UAV 300 may be configured to fly in the direction 444a or 444b, respectfully, for pitching. Alternatively, in response to detecting the controller 100 being moved in the direction 484a or 484b, the UAV 300 may be configured to fly in the direction 444b or 444a, respectfully, for pitching with relative reverse controls. In this configuration, the second axis of rotation (including the directions 484a and 484b) may correspond to pitching of the UAV 300 along the direction 444a or 444b of the UAV 300.

Illustrating with another non-limiting configuration, in response to detecting the controller 100 being moved in the direction 486a or 486b, the UAV 300 may be configured to fly in the direction 446a or 446b, respectfully, for yawing. Alternatively, in response to detecting the controller 100 being moved in the direction 486a or 486b, the UAV 300 may be configured to fly in the direction 446b or 446a, respectfully, for yawing with relative reverse controls. In this configuration, the third axis of rotation (including the directions 486a and 486b) may correspond to yawing of the UAV 300 along the direction 446a or 446b of the UAV 300.

In some embodiments, moving the controller 100 in the direction 472a or 472b may correspond to the UAV 300 moving in the direction 432a, 432b, 444a, or 444b with any suitable mapping therebetween. In some embodiments, the direction 472a or 472b (in addition to the direction 484a or 484b) may correspond to the pitching of the UAV 300 in the directions 444a or 444b. In other embodiments, the direction 472a or 472b may correspond to the UAV 300 moving straight in the directions 432a or 432b.

In some embodiments, moving the controller 100 in the direction 474a or 474b may correspond to the UAV 300 moving in the direction 434a, 434b, 442a, or 442b with any suitable mapping therebetween. In some embodiments, the direction 474a or 474b (in addition to the direction 482a or 482b) may correspond to the rolling of the UAV 300 in the directions 442a or 442b. In other embodiments, the direction 474a or 474b may correspond to the UAV 300 moving straight in the directions 434a or 434b.

In some embodiments, the controller 100 may not provide correspondence between moving in the directions 472a, 472b, 474a, and/or 474b given that 4 DOF may be sufficient for flying some UAV.

Moving the controller 100 in the first, second, and third axes of translation (e.g., in directions 472a, 472b, 474a, 474b, 476a, 476b) may correspond to the camera 490 being moved (by the gimbal 492) in the directions 452a, 452b, 454a, 454b, 456a, 456b with any suitable mapping therebetween. Moving the controller 100 in the first, second, and third axes of rotation (e.g., in directions 482a, 482b, 484a, 484b, 486a, 486b) may correspond to the camera 490 being moved (by the gimbal 492) in the directions 462a, 462b, 464a, 464b, 466a, 466b with any suitable mapping therebetween.

In some embodiments, the mapping/correspondence configurations described herein may be static. The mapping/correspondence configuration may be selected automatically by the processor 215 in some embodiments. In some embodiments, the user may select one of a plurality of existing mapping/correspondence configurations or program new mapping/correspondence configurations based on preference of the user via the first controller 210, second controller 220, third controller 230, and/or input device 270 (fourth controller).

In other embodiments, the mapping/correspondence configurations may be selected by the processor 215 based on the orientation of the controller 100. In some embodiments, the second controller 220 or the input device 270, as coupled to the processor 215, may determine an orientation of the controller 100. The orientation of the controller 100 may refer to a manner in which the user is holding the controller 100. In response to determining that the controller 100 is in a first orientation, a first mapping/correspondence configuration may be selected. On the other hand, to determine that the controller 100 is in a second orientation, a second mapping/correspondence configuration different from the first mapping/correspondence configuration may be selected.

In some embodiments, flight control may be shared between one or more of the first controller 210, the second controller 220, the third controller 230, and/or the input device 270 (the fourth controller). Illustrating with a non-limiting example, rolling (directions 442a and 442b), pitching (directions 444a and 444b), and yawing (directions 446a and 446b) may be controlled by one of the first controller 210 and the second controller 220 while throttling (directions 426a and 436b) may be controlled by another one of the first controller 210 and the second controller 220. Illustrating with another non-limiting example, rolling (directions 442a and 442b), pitching (directions 444a and 444b), and yawing (directions 446a and 446b) may be controlled by the first controller 210 while throttling (directions 426a and 436b) may be controlled by the input device 270 (e.g., via a virtual slider presented on a touch screen of the input device 270) or the third controller 230. Flight control may be shared in any suitable manner among the controllers 210, 220, 230, and 270. Control for the orientation and position of the camera 480 may likewise be shared.

In additional or alternative embodiments, the first controller 210 may be configured to control aspects of the UAV 300 other than or in addition to the flight of the UAV 300. Moving the first controller 210 in one of the directions 412a-426b with a certain amount of force, acceleration, frequency, and a combination thereof may represent different commands. Illustrating with a non-limiting example, pressing the first controller 210 down (in the direction 416b) a number of times (e.g., twice) may indicate selection of a flight mode (e.g., the "altitude-hold" mode). Illustrating with another non-limiting example, rotating the first controller 210 along an axis of rotation (in the direction 426a or 426b) a number of times (e.g., twice) may returning the camera 490 to an initial position.

In additional or alternative embodiments, the second controller 220 may be configured to control aspects of the UAV 300 other than or in addition to the flight of the UAV 300. Moving the controller 100 in one of the directions 472a-486b with a certain amount of force, acceleration, frequency, and a combination thereof may represent different commands. Illustrating with a non-limiting example, moving the controller 100 down (in the direction 476b) a number of times (e.g., twice) may indicate selection of a flight mode (e.g., the "altitude-hold" mode). Illustrating with another non-limiting example, rotating the controller 100 along an axis of rotation (in the direction 484a or 484b) a number of times (e.g., twice) may returning the camera 490 to an initial position.

Figure 5:
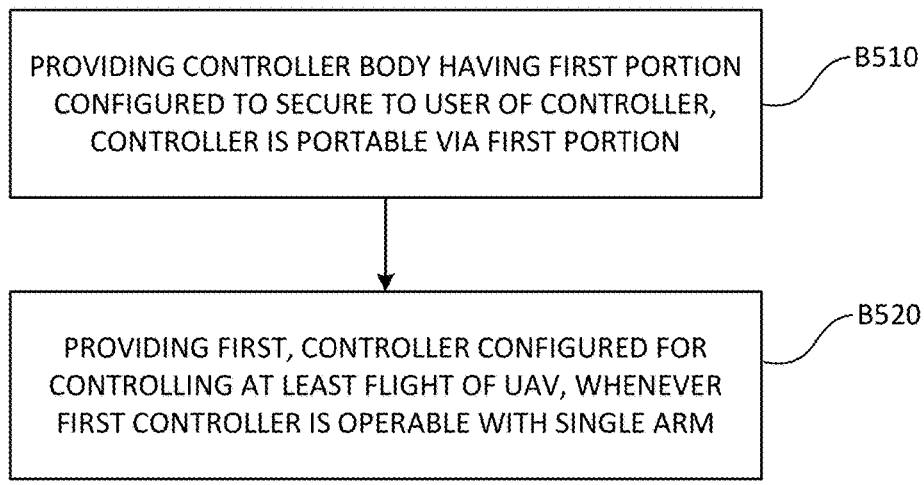
FIG. 5 is a process flow diagram illustrating an example of a method for providing the controller according to some embodiments.

FIG. 5 is a process flow diagram illustrating an example of a method 500 for providing the controller according to some embodiments. Referring to block B510, the controller body 150 having the first portion 120 may be provided. The first portion 120 may be configured to secure to the user of the controller 100. The controller 100 may be portable via the first portion 120 without the user using any hands. At block B520, the first controller 110 configured for controlling at least the flight of the UAV 300 may be provided. In additional or alternative embodiments, one or more of the second controller 220, the third controller 230, or the feedback device 205 may be provided. In additional or alternative embodiments, the controller 100 may be operatively coupled to the wireless communication device 250 via the electrical connection 252 for the fourth controller (the input device 270). The controller 100 may be operable with a single hand of the user. The flight of the UAV 100 may be controlled with a single hand (e.g., the first hand) of the user.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. An apparatus for controlling an Unmanned Aerial Vehicle (UAV), the apparatus comprising:
    a first portion forming a sleeve configured to detachably secure the apparatus to at least a portion of an arm of a user, wherein the sleeve includes a C-shaped cross section defining an interior volume for receiving the arm of the user;
    a second portion abutting the first portion and comprising:
        a radio coupled to an antenna and configured to exchange radio frequency (RF) signals with the UAV; and
        a first controller configured to receive, from a single hand of the user, input comprising three axes of translation and three axes of rotation; and
    a third portion coupled to the first portion and configured to secure a display to the apparatus.

2. The apparatus of claim 1, wherein the display is configured to present visual data from a camera of the UAV to the user.

3. The apparatus of claim 1, wherein the display is configured to present one or more of a map, navigation information, way points, and notifications to the user.

4. The apparatus of claim 1, wherein the display comprises a wireless communication device.

5. The apparatus of claim 4, wherein the wireless communication device is configured to control one or more operations of the UAV based on input provided by a second hand of the user while the apparatus is secured to the arm of the user.

6. The apparatus of claim 4, wherein the wireless communication device is further configured to control one or more of a flight mode of the UAV, at least one sensor of the UAV, at least one camera of the UAV, an orientation of the UAV, software settings on the UAV, landing mode of the UAV, take-off configurations of the UAV, and payload settings of the UAV based on input provided by a second hand of the user while the apparatus is secured to the arm of the user.

7. The apparatus of claim 1, wherein the first controller comprises an interactive element configured to control a flight of the UAV based on the input from the single hand of the user.

8. The apparatus of claim 7, wherein the interactive element is configured to control throttling, yawing, pitching, and rolling of the UAV.

9. The apparatus of claim 1, wherein the first controller comprises a joystick configured to provide six degrees of freedom.

10. The apparatus of claim 1, wherein the first portion forms a brace configured to detachably secure the apparatus to at least a portion of the arm of the user.

11. The apparatus of claim 1, wherein the first portion comprises a strap configured to detachably secure the apparatus to at least a portion of the arm of the user.

12. The apparatus of claim 1, further comprising a second controller independent of the first controller.

13. The apparatus of claim 12, wherein:
    the first controller is configured to control a flight of the UAV; and
    the second controller is configured to control one or more of a flight mode of the UAV, at least one sensor of the UAV, at least one camera of the UAV, an orientation of the UAV, software settings on the UAV, landing mode of the UAV, take-off configurations of the UAV, and payload settings of the UAV.

14. The apparatus of claim 12, wherein:
    the first controller is configured to be operated by a number of fingers and a wrist of the single hand of the user; and
    the second controller is configured to be operated by a thumb of the single hand of the user.

15. The apparatus of claim 12, wherein the second controller comprises an Inertial Measurement Unit (IMU).

16. The apparatus of claim 15, wherein the IMU comprises at least three accelerometers and three gyroscopes.

17. The apparatus of claim 12, wherein the second controller comprises one or more of a button, wheel, mouse, level, slider, touch screen, knob, joystick, switch, or trackball.

18. The apparatus of claim 1, further comprising a feedback device configured to provide one or more of audio feedback, visual feedback, and tactile feedback to the user based on a feedback signal provided by the UAV.

19. The apparatus of claim 1, further comprising a charging apparatus configured to wirelessly charge the UAV.

20. The apparatus of claim 1, further comprising a beacon configured to assist the user controlling a landing of the UAV.

21. A method of controlling an Unmanned Aerial Vehicle (UAV), the method comprising:
    detachably securing a first portion of an apparatus to one arm of a user, wherein the first portion forms a sleeve including a C-shaped cross section defining an interior volume for receiving the one arm of the user;
    exchanging radio frequency (RF) signals with the UAV using a radio and antenna provided on a second portion of the apparatus, the second portion abutting the first portion;
    providing, to a first controller provided on the second portion, user input comprising three axes of translation and three axes of rotation using a single hand of the user; and
    securing a display to a third portion of the apparatus, the third portion abutting the first portion.

22. The method of claim 21, wherein the display is configured to present visual data from a camera of the UAV to the user.

23. The method of claim 21, wherein the display comprises a wireless communication device configured to control one or more operations of the UAV based on input provided by a second hand of the user while the apparatus is secured to the arm of the user.

24. The method of claim 21, wherein the first controller comprises a 6-axis joystick configured to provide six degrees of freedom.

25. An apparatus for controlling an Unmanned Aerial Vehicle (UAV), the apparatus comprising:

a first portion configured to detachably secure the apparatus to an arm of a user;

a second portion abutting the first portion and comprising:
- a radio coupled to an antenna and configured to exchange radio frequency (RF) signals with the UAV;
- a first controller configured to receive, from a single hand of the user, input comprising three axes of translation and three axes of rotation to control a flight of the UAV, wherein the first controller is configured to be operated by a number of fingers and a wrist of the single hand of the user; and
- a second controller independent of the first controller and configured to control one or more of a flight mode of the UAV, at least one sensor of the UAV, at least one camera of the UAV, an orientation of the UAV, software settings on the UAV, landing mode of the UAV, take-off configurations of the UAV, and payload settings of the UAV, wherein the second controller is configured to be operated by a thumb of the single hand of the user; and a third portion coupled to the first portion and configured to secure a display to the apparatus.

26. The apparatus of claim 25, wherein the display comprises a wireless communication device configured to present visual data from a camera of the UAV to the user.

27. The apparatus of claim 25, wherein the input received from the single hand of the user is configured to control a flight of the UAV.

28. The apparatus of claim 25, wherein the display comprises a wireless communication device configured to control one or more of a flight mode of the UAV, at least one sensor of the UAV, at least one camera of the UAV, an orientation of the UAV, software settings on the UAV, landing mode of the UAV, take-off configurations of the UAV, and payload settings of the UAV based on input provided by a second hand of the user while the apparatus is secured to the arm of the user.

29. The apparatus of claim 25, wherein the first controller comprises a joystick configured to provide six degrees of freedom.

30. The apparatus of claim 25, wherein the first portion forms a brace configured to detachably secure the apparatus to at least a portion of the arm of the user.

31. The apparatus of claim 25, wherein the first portion forms a sleeve configured to detachably secure the apparatus to at least a portion of the arm of the user and including a C-shaped cross section defining an interior volume for receiving the arm of the user.

* * * * *